(12) United States Patent  
Davis

(10) Patent No.: US 11,635,890 B2
(45) Date of Patent: Apr. 25, 2023

(54) KEYBOARD HAVING IMPROVED ALPHABET KEY ARRANGEMENT

(71) Applicant: Gail Elizabeth Davis, Houston, TX (US)

(72) Inventor: Gail Elizabeth Davis, Houston, TX (US)

(*) Notice: Subject to any disclaimer, the term of this patent is extended or adjusted under 35 U.S.C. 154(b) by 516 days.

(21) Appl. No.: 16/220,384

(22) Filed: Dec. 14, 2018

(65) Prior Publication Data

US 2019/0187891 A1 Jun. 20, 2019

Related U.S. Application Data

(60) Provisional application No. 62/607,797, filed on Dec. 19, 2017.

(51) Int. Cl.
*G06F 3/0489* (2022.01)
*G06F 3/04886* (2022.01)
*G06F 3/04895* (2022.01)

(52) U.S. Cl.
CPC ...... *G06F 3/04886* (2013.01); *G06F 3/04895* (2013.01); *G06F 3/04897* (2013.01)

(58) Field of Classification Search
CPC ............. G06F 3/04886; G06F 3/04897; G06F 3/04895
See application file for complete search history.

(56) References Cited

U.S. PATENT DOCUMENTS 3,698,533 A 10/1972 Illig et al.
4,180,337 A 12/1979 Otey, III et al.
4,804,279 A * 2/1989 Berkelmans ............... B41J 5/10
 400/94
4,927,279 A 5/1990 Morgan
5,124,702 A * 6/1992 van Ardenne ............. B41J 5/10
 341/22
9,164,592 B2 10/2015 Lambie
(Continued)

FOREIGN PATENT DOCUMENTS

WO 2014/088788 A1 8/2014

OTHER PUBLICATIONS

"The Symmetric Typing Project", posted on Jul. 29, 2015 at https://kennetchaz.github.io/symmetric-typing/, retrieved on Jul. 14, 2020 (Year: 2015).*

(Continued)

*Primary Examiner* — Shourjo Dasgupta
(74) *Attorney, Agent, or Firm* — McCutcheon Joseph, PLLC

(57) ABSTRACT

An arrangement of alphabet keys is provided in a total of three rows. Two of the three rows have a total of nine keys each, and the other row has a total of eight keys. The vowel keys are grouped together in a vowel group having a symmetric shape in which an imaginary line extending vertically divides the vowel group into a left half and right half that is a mirror image of the left half. The vowel group traverses the three rows and at least two columns, and at least a portion of the vowel group is located at a center of the arrangement. The consonant keys are arranged in alphabetical order from left to right on opposite sides of vowel group. A vowel key in the vowel group is centered along the imaginary line to be at a midpoint of the vowel group in a horizontal direction.

24 Claims, 17 Drawing Sheets

(56) References Cited

U.S. PATENT DOCUMENTS

| | | | |
|---|---|---|---|
| 2005/0008418 A1 | 1/2005 | Green | |
| 2005/0162402 A1* | 7/2005 | Watanachote | G06F 3/03547 |
| | | | 345/173 |
| 2006/0228149 A1 | 10/2006 | Harley | |
| 2007/0147932 A1* | 6/2007 | Giles | G09B 13/02 |
| | | | 400/472 |
| 2008/0304892 A1 | 12/2008 | Baker | |
| 2009/0237359 A1* | 9/2009 | Kim | G06F 3/04886 |
| | | | 345/168 |
| 2011/0078567 A1* | 3/2011 | Kim | G06F 3/0236 |
| | | | 715/702 |
| 2012/0176320 A1 | 7/2012 | Burrell, IV | |
| 2012/0235912 A1* | 9/2012 | Laubach | G06F 3/04895 |
| | | | 345/163 |
| 2014/0164975 A1* | 6/2014 | Kang | G06F 3/04817 |
| | | | 715/773 |
| 2014/0199106 A1* | 7/2014 | Seely | H01H 13/14 |
| | | | 400/91 |
| 2016/0092106 A1* | 3/2016 | Crick | G06F 3/0237 |
| | | | 345/172 |
| 2018/0074694 A1* | 3/2018 | Lehmann | G06F 3/044 |

OTHER PUBLICATIONS

"Truly Ergonomic", available at https://trulyergonomic.com/ergonomic-keyboards, retrieved on Jul. 14, 2020 (Year: 2020).*

* cited by examiner

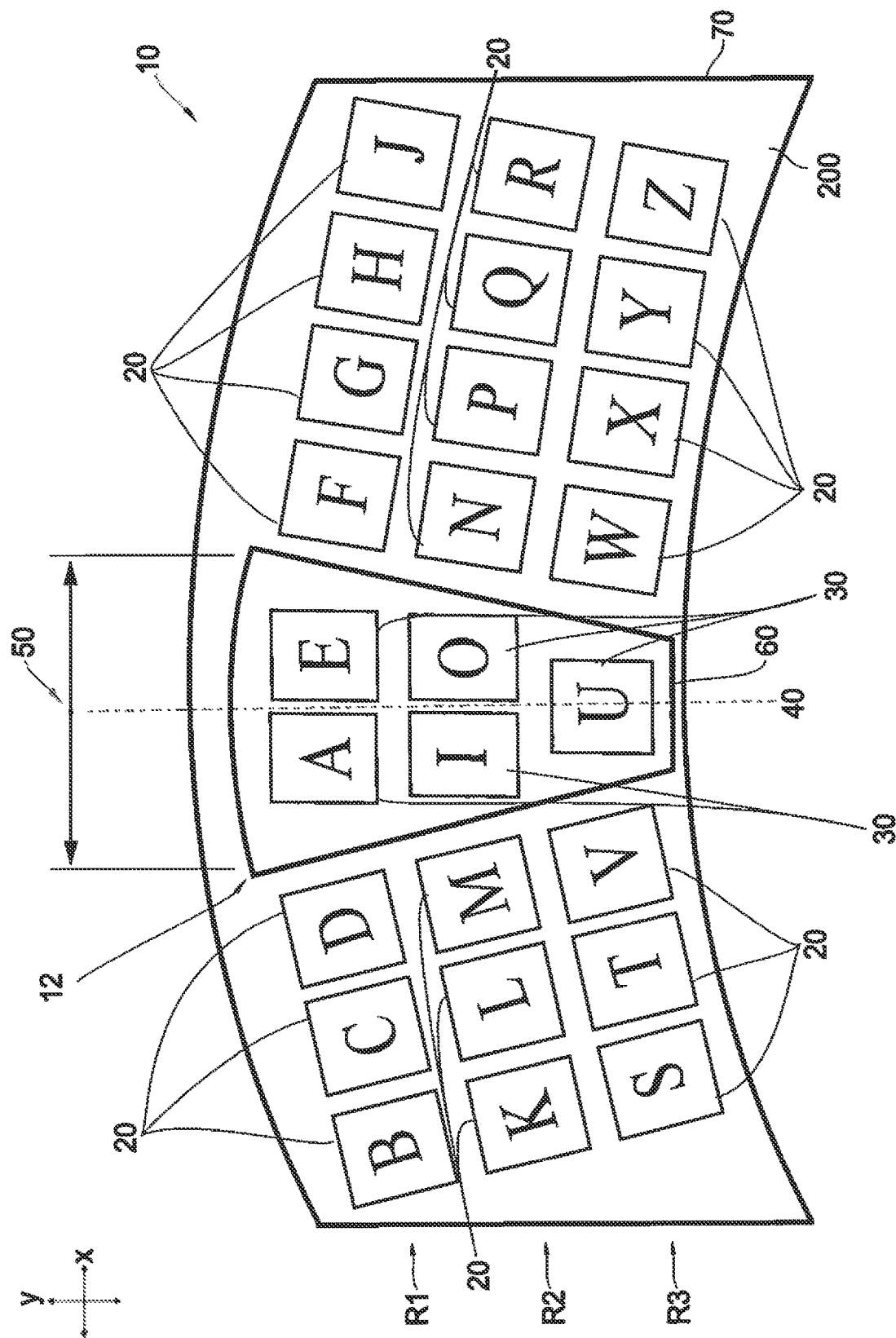

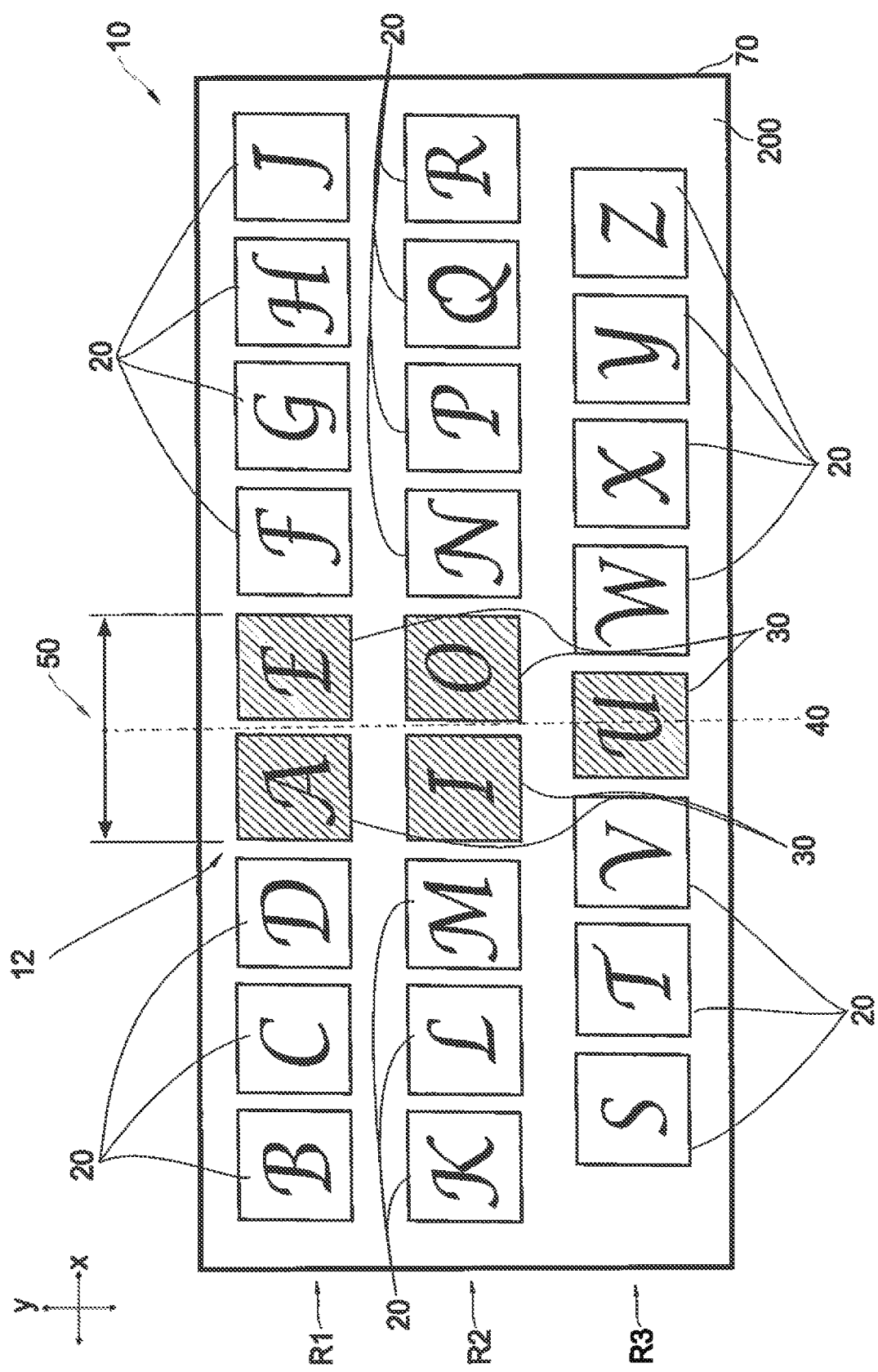

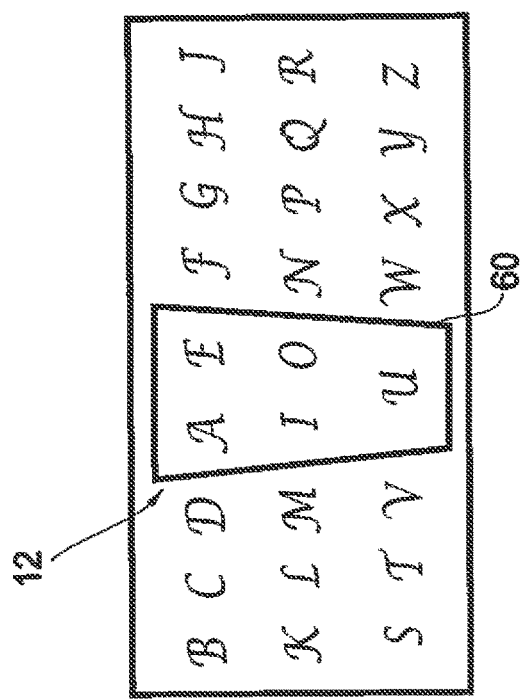
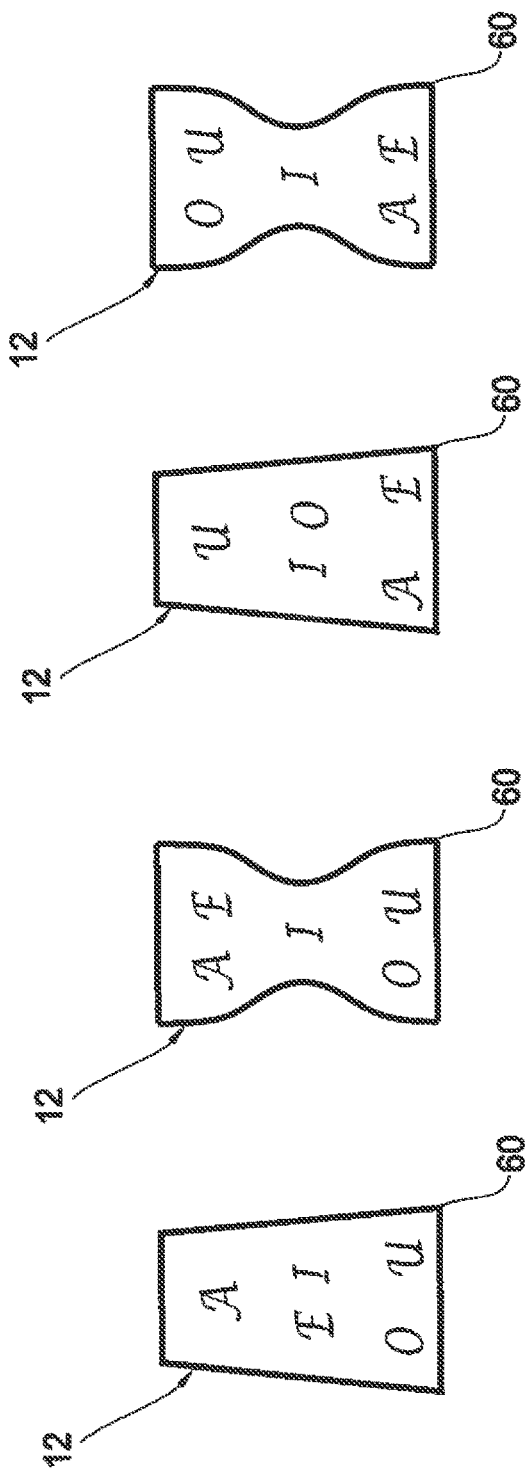

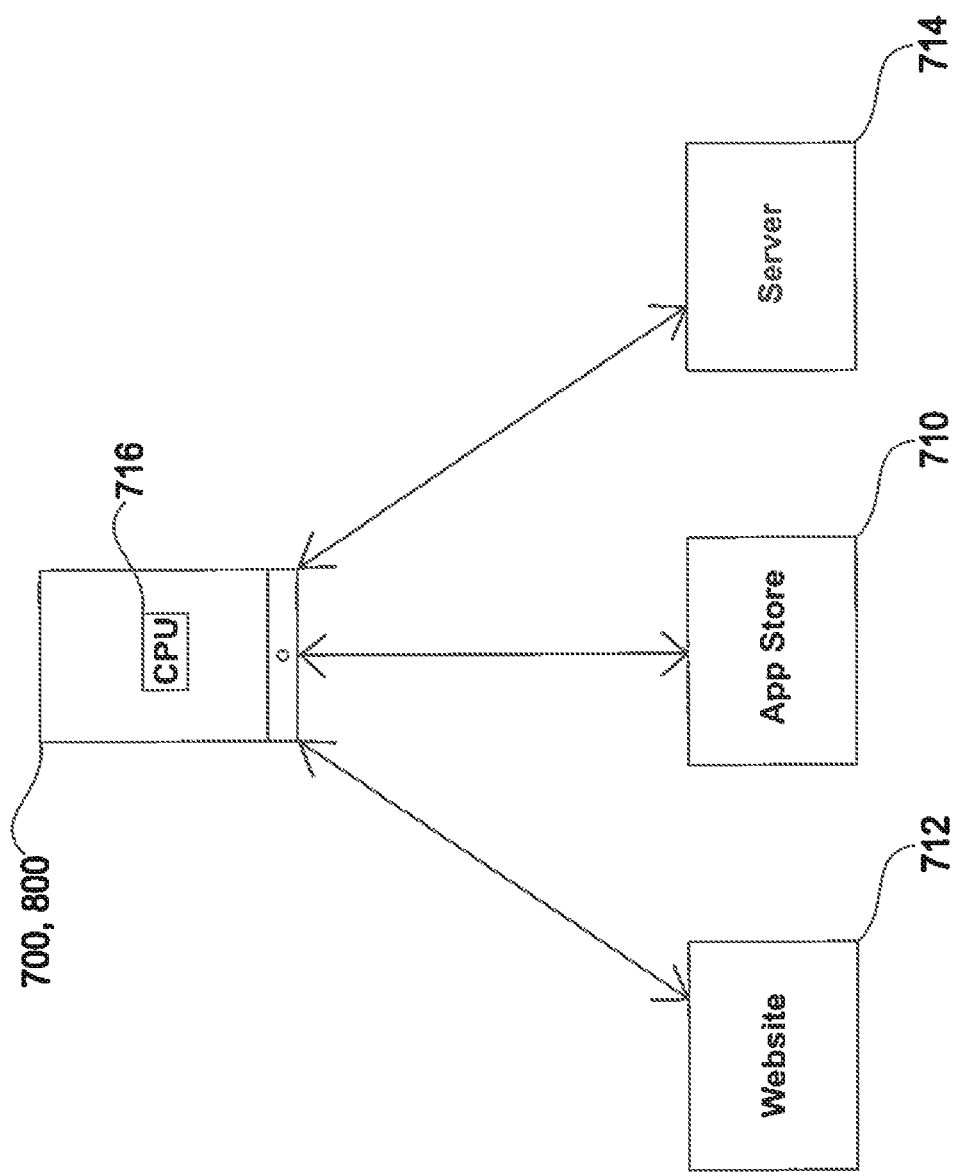

KEYBOARD HAVING IMPROVED ALPHABET KEY ARRANGEMENT

This application claims the benefit of U.S. Provisional Application No. 62/607,797 filed on Dec. 19, 2017. The disclosure of the prior application is hereby incorporated by reference herein in its entirety.

TECHNICAL FIELD

The present disclosure relates to a keyboard, and in particular to the arrangement of alphabet keys in a keyboard. The arrangements disclosed herein provide an intuitive alphabet key layout that is logical, balanced and symmetrical, and that is relatively easy to learn, easy to remember and easy to use.

BACKGROUND

The most common arrangement of English-language alphabet keys in contemporary keyboards is known as the QWERTY layout. That layout, which is shown in FIG. 1, gets its name from the first six letters on the upper left-hand side of the alphabet key arrangement. The QWERTY layout was designed in the 1860's for mechanical typewriters. A popular belief about the QWERTY layout is that the alphabet keys were placed in a random layout, by separating the most commonly used letter combinations, in order to slow down a fast typist and thus prevent jamming of the mechanical typewriters.

Another alphabet key arrangement is the Dvorak design, which was patented in 1936. The Dvorak design was meant to simplify the arrangement of alphabet keys in order to decrease the number of typing errors and increase the speed of the typist. For instance, the design, which is shown in FIG. 2, includes all of the vowel keys together in one row extending from the left side of the arrangement. The Dvorak design has failed to replace the standard QWERTY layout, even though some computer operating systems allow a user to switch from the QWERTY layout to the Dvorak design.

SUMMARY

The jamming of the keys is no longer a concern for modern keyboards, especially for electronic keyboards that are displayed on a digital screen, such as on the screen of a mobile device. The technical reason for the QWERTY layout is thus not very applicable today. Moreover, the random distribution of letters in the QWERTY layout makes the layout awkward. For instance, the letters are not organized according to their alphabetical order, and the vowels are scattered throughout the layout. The QWERTY layout is therefore not intuitive, and can be difficult to use for a young person learning to type words. Furthermore, the rows of letters are uneven. There are ten letter keys in the top row of the layout, nine letter keys in the second row, and only seven letter keys in the third row. The uneven rows result in an unbalanced arrangement.

The Dvorak design is also awkward. The letters are not organized in alphabetical order. Even though the vowels are arranged together in one row, the vowels are not in alphabetical or phonetic order. The fact that the vowels, at least one of which is included in almost every word in the English language, are arranged together on the left side of the design is curious because most people are right hand dominant. The Dvorak design may thus be especially awkward for a majority of the population (which is right hand dominant). The design is also unbalanced, with only seven letter keys in the top row of the design, ten letter keys in the second row, and nine letter keys in the third row.

While accomplished QWERTY and Dvorak typists who have mastered those conventional designs may want to keep those designs, younger people who are learning how to type would benefit from choosing another layout, which may be more intuitive and easier to understand and learn.

Learning to type efficiently involves recalling from memory the location of each letter key on the keyboard. Memory is the faculty of the mind by which information is encoded, stored and retrieved. Short-term memory is also known as working memory. Short-term memory allows recall for a period of several seconds to a minute without rehearsal. Its capacity, however, may be limited. After conducting landmark research on memory, Professor George A. Miller published results showing that the number of objects an average human being can hold in working memory is 7 plus or minus 2 (Miller, G. A., *The magical number seven, plus or minus two: Some limits on our capacity for processing information*, Psychological Review, vol. 63, pp. 81-97 (1956). This result is frequently referred to as Miller's Law, More recent estimates of the capacity of short-tem memory are lower, typically of the order of 4 to 5 items.

Memory capacity can be increased through a process called "chunking". Chunking breaks a group of items into smaller separate groups. For instance, ten-digit telephone numbers in the United States are broken into three chunks of numbers "N" beginning with the area code, a three-digit chunk and followed by a four-digit chunk: NNN NNN NNNN. As an example, the telephone number 8183128631 is easier to remember when it is broken into three chunks: 818 312 8631. The use of brackets and dashes can visually highlight the separated chucks and become a memory prompt that the memory could be recalled form a different area of the brain. Thus, (818) 312-8631 may be easier for the brain to remember than 818 312 8631. This method of remembering telephone numbers is more effective than attempting to remember a string of 10 unseparated digits. This is because the information is "chunked" into meaningful groups of numbers.

The research performed by Professor Miller found that in chunking, it is best to start with no more than 3 digits, and if there is to be a 4-digit chunk, it should be last in the sequence.

What is needed is an improved arrangement of alphabet keys having an intuitive design that is logical, balanced and symmetrical, and that is relatively easy to learn, easy to remember and easy to use. The present disclosure discusses such an arrangement. The present disclosure also discusses arrangements that make the individual letters easier to find by chunking small groups of alphabet keys in a logical manner. Because at least one vowel is found in almost every word in the English language, the vowel keys in a keyboard are more frequently used. It may thus be helpful to arrange and "chunk" these frequently used vowel keys at a conspicuous location on the keyboard where they are easily found by a user, and so that the vowel keys are more centrally located for a user than the consonant keys.

In one embodiment, a keyboard comprises an arrangement of alphabet keys in which the alphabet keys are provided in a total of three rows extending in a horizontal direction. Each alphabet key in the three rows represents one letter of the English-language alphabet, so that the three rows of alphabet keys include all consonants and all vowels of the English-language alphabet. Two of the three rows of alphabet keys have a total of nine keys each, and one of the three rows of alphabet keys has a total of eight keys. The consonants are represented with consonant keys and vowels are represented by vowel keys. The vowel keys are grouped together in a vowel group having a symmetric shape in which an imaginary line extending vertically perpendicular to the horizontal direction divides the vowel group into a left half and right half that is a mirror image of the left half. The vowel group traverses the three rows and at least two columns, and at least a portion of the vowel group is located at a center of the arrangement. The consonant keys are arranged in alphabetical order from left to right on opposite sides of vowel group, such that three columns of the consonant keys are on one of a left side of the vowel group and a right side of the vowel group and four columns of the consonant keys are on the other of the left side and the right side of the vowel group. At least one vowel key in the vowel group is centered along the imaginary line to be at a midpoint of the vowel group in the horizontal direction.

The vowel group may be outlined by a visible line or shape delineating the group of vowels from the consonant keys. The visible line or shape may be substantially triangular shaped.

The vowel keys may have a color, and the consonant keys may have no color or have a color that is different than or the same as the color of the vowel keys.

The letters on the consonant keys may have a color, and letters on the vowel keys may have a color that is different than or the same as the color of the letters on the consonant keys.

Three columns of the consonant keys may be on the left side of the vowel group, and four columns of the consonant keys may be on the right side of the vowel group. Alternatively, the four columns of the consonant keys may be on the left side of the vowel group, and three columns of the consonant keys may be on the right side of the vowel group.

The consonant keys in each column may be vertically aligned with each other so that none of the consonant keys in a column is offset in the horizontal direction from other consonant keys in that column.

The consonant keys in each column may be vertically unaligned with each other so that each consonant key in a column is offset in the horizontal direction from an adjacent consonant key in that column.

The symmetric shape of the vowel group may be substantially triangular, such that vowel key "a" and vowel key "e" are in a first row of the three rows of alphabet keys, vowel key "i" and vowel key "o" are in a second row of the three rows of alphabet keys, and vowel key "u" is in a third row of the three rows of alphabet keys and is centered in the horizontal direction with respect to the vowel key "i" and the vowel key "o". In an alternative embodiment, the symmetric shape of the vowel group is substantially triangular, such that vowel key "a" is in a first row of the three rows of alphabet keys, vowel key "e" and vowel key "i" are in a second row of the three rows of alphabet keys, and vowel key "o" and vowel key "u" are in a third row of the three rows of alphabet keys, and vowel key "a" is centered in the horizontal direction with respect to the vowel key "e" and the vowel key "i". An a further embodiment, the symmetric shape of the vowel group is substantially triangular, such that vowel key "u" is in a first row of the three rows of alphabet keys, vowel key "i" and vowel key "a" are in a second row of the three rows of alphabet keys, and vowel key "a" and vowel key "e" are in a third row of the three rows of alphabet keys, and vowel key "u" is centered in the horizontal direction with respect to the vowel key "i" and the vowel key "a". Further, the symmetric shape of the vowel group may be substantially triangular, such that vowel key "i" and vowel key "o" are in a first row of the three rows of alphabet keys, vowel key "a" and vowel key "e" are in a second row of the three rows of alphabet keys, and vowel key "u" is in a third row of the three rows of alphabet keys and is centered in the horizontal direction with respect to the vowel key "a" and the vowel key "e". Alternatively, the symmetric shape of the vowel group may be substantially triangular, such that vowel key "u" is in a first row of the three rows of alphabet keys, vowel key "a" and vowel key "e" are in a second row of the three rows of alphabet keys, and vowel key "i" and vowel key "o" are in a third row of the three rows of alphabet keys, and vowel key "u" is centered in the horizontal direction with respect to the vowel key "a" and the vowel key "e".

The symmetric shape of the vowel group is an hourglass, such that vowel key "a" and vowel key "e" are in a first row of the three rows of alphabet keys, vowel key "i" is in a second row of the three rows of alphabet keys and is centered in the horizontal direction with respect to the vowel key "a" and the vowel key "e", and vowel key "o" and vowel key "u" are in a third row of the three rows of alphabet keys. In an alternative embodiment, the symmetric shape of the vowel group is an hourglass, such that vowel key "o" and vowel key "u" are in a first row of the three rows of alphabet keys, vowel key "i" is in a second row of the three rows of alphabet keys and is centered in the horizontal direction with respect to the vowel key "o" and the vowel key "u", and vowel key "a" and vowel key "e" are in a third row of the three rows of alphabet keys.

A consonant key in the upper left corner of the arrangement may be vertically unaligned with a consonant key in the lower left corner of the arrangement so that there is an offset in the horizontal direction between the consonant key in the upper left corner of the arrangement and the consonant key in the lower left corner of the arrangement, and a consonant key in the upper right corner of the arrangement may be vertically unaligned with a consonant key in the lower right corner of the arrangement so that there is an offset in the horizontal direction between the consonant key in the upper right corner of the arrangement and the consonant key in the lower right corner of the arrangement.

An outline around a perimeter of the alphabet keys may be a rectangle shape.

Each of the three columns of the consonant keys and each of the four columns of the consonant keys may be angled from the vowel group relative to the horizontal direction, so that the arrangement has a curved shape.

The keyboard may be a virtual keyboard on a digital screen. In some embodiments of the virtual keyboard, the vowel group may be outlined by a visible line or shape delineating the group of vowels from the consonant keys. The vowel keys may have a color, and the consonant keys may have no color or may have a color that is different than or the same as the color of the vowel keys. The letters on the consonant keys may have a color, and the letters on the vowel keys may have a color that is different than or the same as the color of the letters on the consonant keys. At least one of an arrangement of the consonant keys, an arrangement of the vowel keys, the symmetric shape of the vowel group, the visible line or shape, a color of the vowel keys, the letters on the consonant keys, and the letters on the vowel keys, may be changeable by a user so that the alphabet key arrangement is changeable/customizable by the user via a computer program.

In another embodiment, the keyboard of the present disclosure may be the keyboard of a mobile device.

BRIEF DESCRIPTION OF THE FIGURES

FIG. 5 shows a variation of the preferred embodiment of an alphabet key arrangement for a keyboard.

FIG. 6 shows another embodiment of an alphabet key an arrangement for a keyboard.

FIGS. 9a-9e show different embodiments of vowel keys arranged in a vowel group.

FIG. 14 shows an embodiment of a system in which a mobile device interacts with external sites.

DETAILED DESCRIPTION

Before explaining the disclosed embodiments in detail, it is to be understood that the present disclosure is not limited to the particular embodiments depicted or described, and that the invention can be practiced or carried out in various ways. Before describing selected embodiments of the present disclosure in detail, it is to be understood that the present invention is not limited to the particular embodiments described herein. The disclosure and description herein is illustrative and explanatory of one or more presently preferred embodiments and variations thereof, and it will be appreciated by those skilled in the art that various changes in the design, organization, means of operation, structures and location, methodology, and use of mechanical equivalents may be made without departing from the spirit of the invention.

As well, it should be understood that the drawings are intended to illustrate and plainly disclose presently preferred embodiments to one of skill in the art, but are not intended to be manufacturing level drawings or renditions of final products and may include simplified conceptual views to facilitate understanding or explanation. As well, the relative size and arrangement of the components may differ from that shown and still operate within the spirit of the invention.

Moreover, it will be understood that various directions such as "upper", "lower", "bottom", "top", "left", "right", and so forth are made only with respect to explanation in conjunction with the drawings, and that components may be oriented differently, for instance, during transportation and manufacturing as well as operation. Because many varying and different embodiments may be made within the scope of the concept(s) herein taught, and because many modifications may be made in the embodiments described herein, it is to be understood that the details herein are to be interpreted as illustrative and non-limiting.

Figure 1:
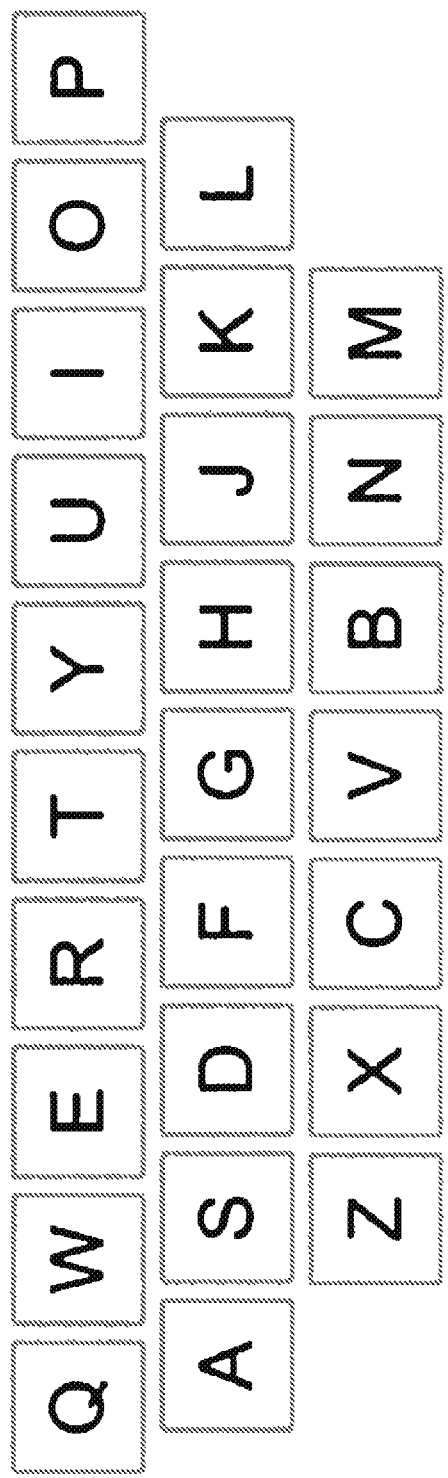
FIG. 1 shows a conventional alphabet key layout (QWERTY).
Figure 2:
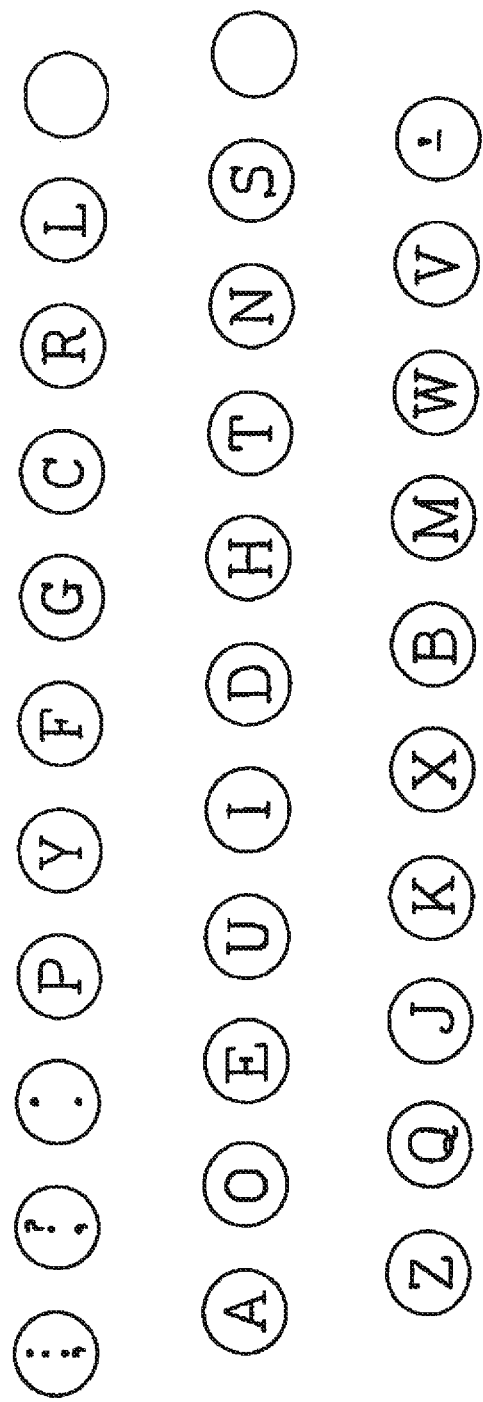
FIG. 2 shows another conventional alphabet key layout (Dvorak).
Figure 3:
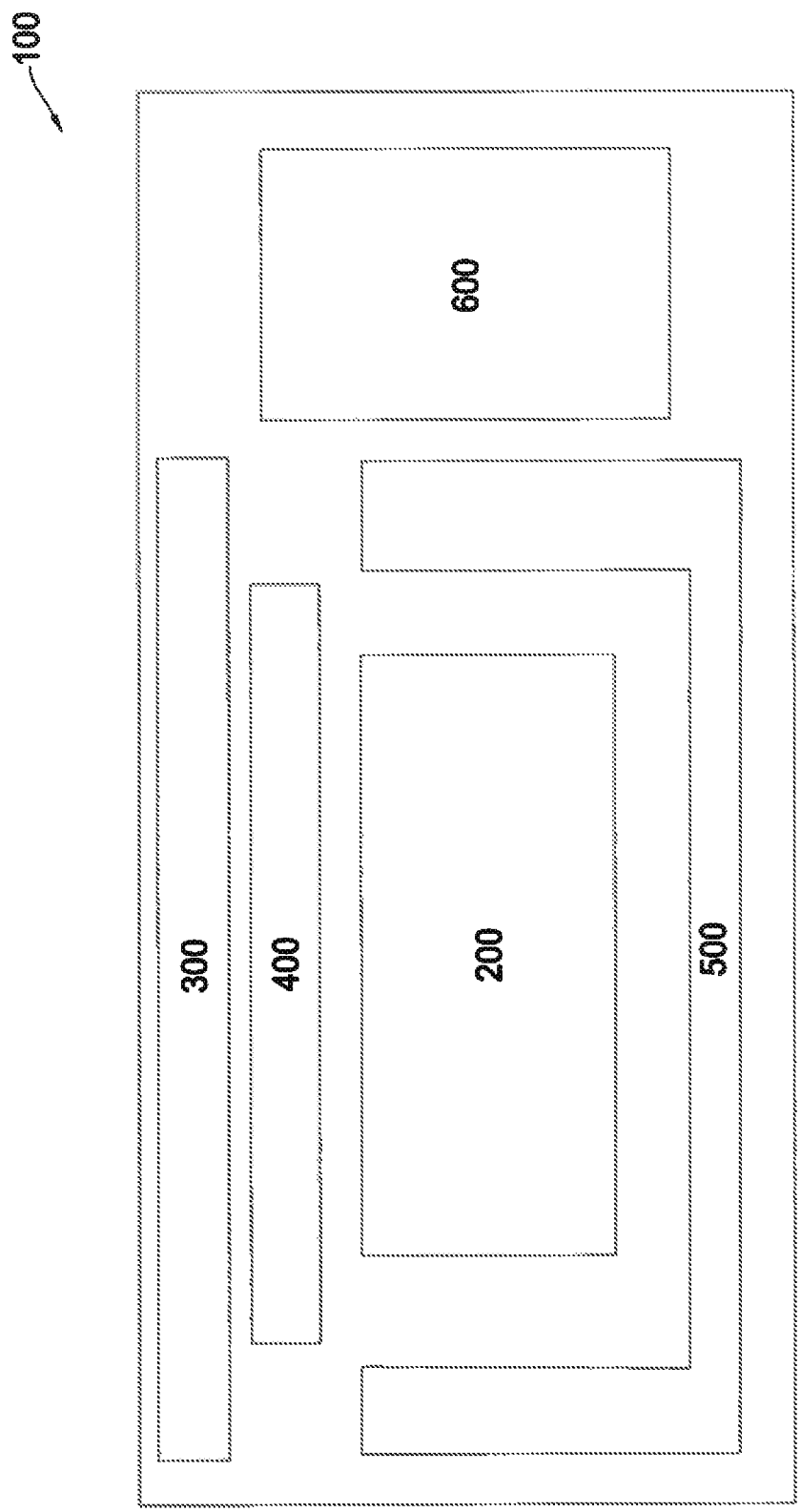
FIG. 3 shows an embodiment of a keyboard.

FIG. 3 shows an embodiment of a keyboard 100 that may include the alphabet key arrangements discussed herein. The keyboard 100 may include several sections of keys that are divided according to key type. In the embodiment, alphabet section 200 includes only alphabet keys, i.e., each key representing one letter of the alphabet. Section 300 may include function keys, for example, keys representing functions "F1" through "F9". Section 400 may primarily include number keys having the numbers "1" through "0" for example, and may also represent symbols, such as "#", "$", "%", among others when those keys are selected in combination with a "Shift" key, as is conventionally known. Section 500 may include miscellaneous keys, including the space bar, "Shift", "Tab", "Caps Lock", "Ctrl", "Fn", "Alt", "Enter" and "Backspace", "Delete", among others, as is conventionally known. Section 600 may include what is conventionally known as a number pad, with the number keys representing numbers "1" through "9" arranged in a three-key by three-key pattern. In embodiments of the keyboard 100 of the present disclosure, sections 300, 400, 500 and 600, and combinations thereof, are optional, as the disclosed embodiments primarily concern the arrangement of the alphabet keys in the alphabet section 200 on the keyboard 100. Thus, the keyboard 100 of the present disclosure may include only the alphabet section 200 alone, or may include the alphabet section 200 with any one or a combination of the other sections 300, 400, 500 and 600. In an embedment in which the alphabet section 200 is the only section on the keyboard 100, the alphabet section 200 would substantially fill the area of the keyboard 100, so that the keyboard 100 would be considered as only an alphabet keyboard.

The keyboard 100 shown in FIG. 3 is rectangular. In other embodiments, the keyboard 100 may be curved, or have another shape that is customized by the user or manufacturer.

The keyboard 100 containing the alphabet key arrangement of the present disclosure may be a hard keyboard that is an accessory to a computing device, such as a desk-top computer, a tablet computer, and a television. In other embodiments, the hard keyboard may be part of a laptop computer, tablet computer, and notebook computer, and be detachably attachable to such computers. The hard keyboard may be wired to any of the above computing devices, or may be wirelessly connected thereto. In other embodiments, the keyboard 100 may be a virtual (electronic) keyboard that is displayed on a digital screen. The digital screen may be a touchscreen. For instance, the virtual keyboard may be displayed on a digital screen of a mobile device, such as a mobile phone, tablet, portable computer, television, and watch. The virtual keyboard may be displayed on a digital screen of a vehicle, such as an automobile, an aircraft, a water vessel, a spacecraft, and a construction vehicle. In further embodiments, the virtual keyboard may be displayed on a digital screen of office equipment, such as a copy machine, a fax machine, a printer, and combinations thereof (a multi-function peripheral), and a security system. The virtual keyboard may be displayed on a digital screen of any product that has a digital screen.

Figure 4:
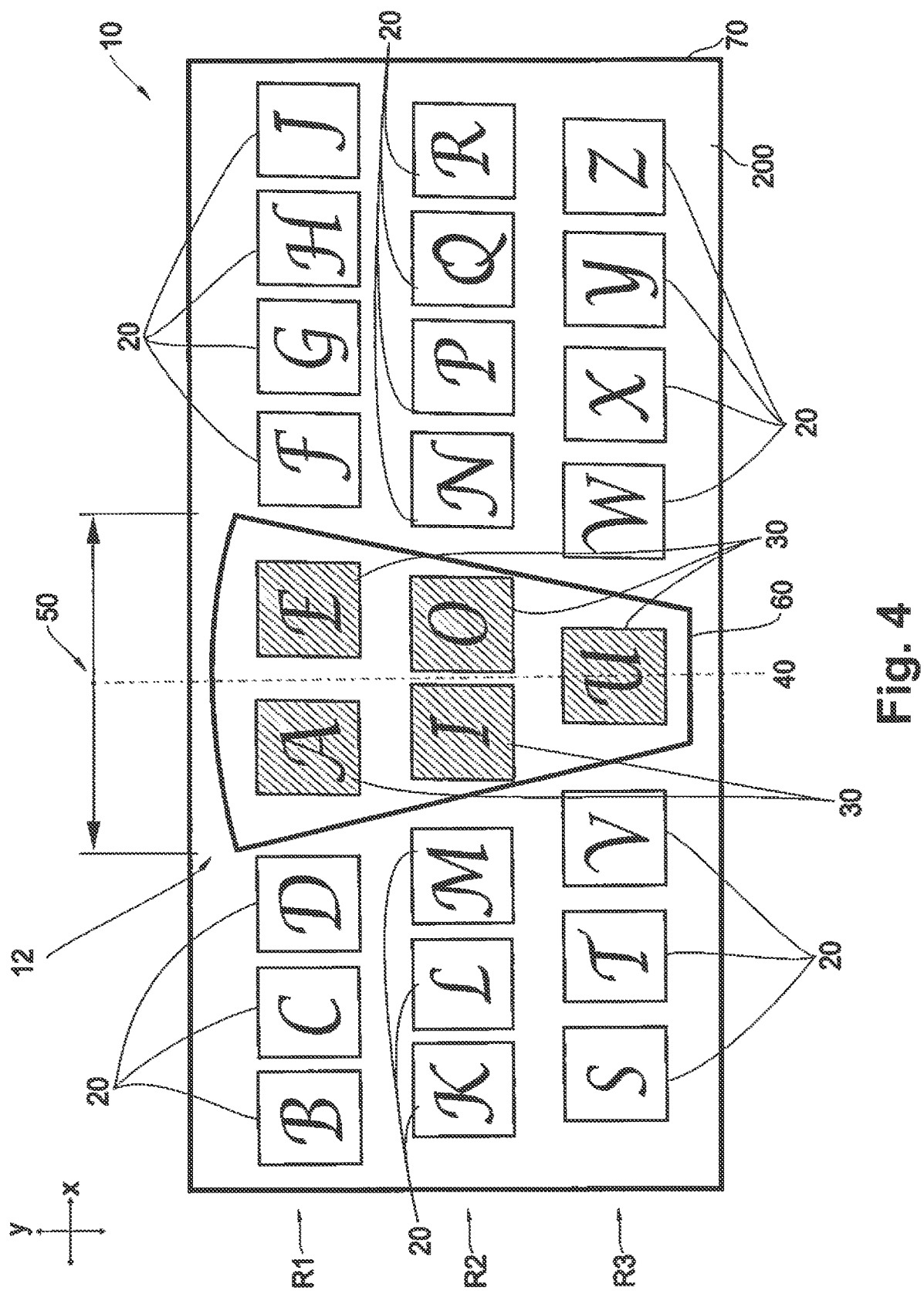
FIG. 4 shows a preferred embodiment of an alphabet key arrangement for a keyboard.

FIG. 4 shows a preferred embodiment of an alphabet key arrangement 10 for a keyboard. The alphabet key arrangement 10 constitutes the alphabet section 200 of the keyboard 100. In this embodiment, the alphabet section 200 is rectangular. The alphabet key arrangement 10 comprises three rows, R1, R2, R3, of alphabet keys. The three rows, R1, R2, R3, extend in a horizontal direction "x" of the alphabet key arrangement 10. In the embodiment, row R1 and row R2 each has a total of nine keys, while row R3 has a total of eight keys. There are thus a total of twenty-six keys in the alphabet key arrangement 10, so that each alphabet key in the alphabet key arrangement 10 represents one letter of the English-language alphabet. The consonant letters of the alphabet are represented with consonant keys 20 and the vowel letters of the alphabet are represented by vowel keys 30. The spacing, or distance, between the each of the consonant keys 20 and between each of the vowel keys 30 is not limited to any particular magnitude, and the spacing or distance shown in the attached drawing figures are exemplary only. That is, each of the consonant keys 20 may be closer to or farther from each other than is illustrated in the drawings, and each of the vowel keys 30 may be closer to or farther from each other than is illustrated in the drawings. The letters on the consonant keys 20 and the vowel keys 30 in the drawings of this disclosure are capital letters as an example. In other embodiments, the letters on the consonant keys 20 and the vowel keys 30 may be lowercase, or may be a combination of capital and lowercase letters. Further, the letters may be selectively changed between capital and lower case letters when the alphabet key arrangement 10 is used in virtual keyboard applications. Moreover, the font of the letters on the consonant keys 20 and the vowel keys 30 may be selectively changed in virtual keyboard applications according to a user's preference. For instance, a software application associated with and controlling the virtual keyboard may allow a user to select a font, such as Times New Roman, and change the font to Arial or to Calibri, or to some other font.

The vowel keys 30 are grouped, or "chunked" together in a vowel group 12. The vowel group 12 consists of vowel key "A", vowel key "E", vowel key "I", vowel key "O", and vowel key "U", as shown in FIG. 4. In this embodiment, the vowel group 12 traverses the three rows R1, R2, R3, so that a portion of the vowel group 12 is in each of the rows R1, R2, R3. In particular, the vowel key "A" and the vowel key "E" are in row R1, the vowel key "I" and the vowel key "O" are in row R2, and the vowel key "U" is in row R3 and is centered with respect to the vowel key "I" and the vowel key "O" in the horizontal direction "x". The vowel group 12 thus has a shape that is substantially triangular, meaning that the shape tapers toward one end of the vowel group 12. In this case, the taper occurs where the vowel key "U" is located. To make the substantially triangular shape and taper more apparent, the vowel key "A" may be vertically unaligned with the vowel key "I" so that the vowel key "A" is offset to the left in the horizontal direction "x" from the vowel key "I", and the vowel key "E" may be vertically unaligned with the vowel key "O" so that the vowel key "E" is offset to the right in the horizontal direction "x" from the vowel key "O", as shown in FIG. 4. In addition, the orientation of the vowel keys "A", "E", "I" and "O" may be slightly angled relative to the horizontal direction "x" so that the vowel keys "A" and "I" lean towards consonant keys "D" and "M", respectively, and so that the vowel keys "E" and "O" lean towards consonant keys "F" and "N", respectively. In an alternative embodiment, the vowel key "A" may be vertically aligned with the vowel key "I" so that there is no offset in the horizontal direction "x" between vowel key "A" and the vowel key "I", and the vowel key "E" may be vertically aligned with the vowel key "O" so that there is no offset in the horizontal direction "x" between the vowel key "E" and the vowel key "O" (see, e.g., FIG. 5). The vowel group 12 is provided in at least two columns of the alphabet key arrangement 10, with the vowel key "A" and the vowel key "I" being in one of the two columns, and the vowel key "E" and the vowel key "O" being in the other of the two columns. In addition, at least a portion of the vowel group 12 is located over a center of the alphabet key arrangement 10, so that the vowel group 12 is substantially in the middle of the alphabet key arrangement 10 with respect to the horizontal direction "x" as shown in FIG. 4. Grouping the vowel keys 30 together and having the vowel group 12 substantially in the middle of the alphabet key arrangement 10 makes the vowel keys 30 easier for a user to locate amongst all the alphabet keys. In an embodiment, the vowel keys 30 may be physically raised or indented relative to the consonant keys 20, so as to provide a physical contrast with the consonant keys 20 that makes the vowel keys 30 stand out. In a virtual keyboard, this embodiment may include displaying the vowel keys 30 in three dimensions (3D) while the consonant keys 20 are displayed only in two dimensions, so as to provide a visual contrast with the consonant keys 20 that makes the vowel keys 30 stand out. Alternatively, the consonant keys 20 may also be displayed in 3D, but with dimensions that are less prominent than the dimensions of the vowel keys 30 so that the vowel keys 30 stand out relative to the consonant keys 20. For instance, the 3D vowel keys 30 may appear raised more than the 3D consonant keys 20. The 3D display may make the keys either raised or indented, or a combination thereof.

FIG. 4 also shows that the vowel group 12 has a symmetric shape, such that an imaginary line 40 extending vertically through a center of the vowel group 12 and dividing the vowel group 12 into a left side and a right side results in the left side and the right side of the vowel group 12 being mirror images of each other. In the symmetric shape, at least one vowel key 30 in the vowel group 12 is centered along the imaginary line 40 to be at a midpoint 50 of the vowel group 12 in the horizontal direction "x" extending along the three rows R1, R2, R3. In the embodiment illustrated in FIG. 4, the vowel key "U" is centered along the imaginary line 40 to be at a midpoint 50 of the vowel group 12 in the horizontal direction "x".

The consonant keys 20 are arranged in alphabetical order from left to right on opposite sides of vowel group 12. In the embodiment, three columns of the consonant keys 20 are on the left side of the vowel group 12, and four columns of the consonant keys 20 are on the right side of the vowel group 12. The consonant keys 20 on the left side of the vowel group 12 are arranged in a three-by-three pattern in which each row R1, R2, R3 has a "chunk" of three consonant keys. Specifically, consonant keys "B", "C", "D" are in row R1, consonant keys "K", "L", "M" are in row R2, and consonant keys "S", "T", "V" are in row R1 The consonant keys 20 on the right side of the vowel group 12 are arranged in a three-by-four pattern in which each row R1, R2, R3 has a "chunk" of four consonant keys. Consonant keys "F", "G", "H", "J" are in row R1, consonant keys "N", "P", "Q", "R" are in row R2, and consonant keys "W", "X", "Y", "Z" are in row R3. In this embodiment, more consonant keys 20, i.e., twelve, are placed on the right side of the vowel group 12 than on the left side which has nine consonant keys 20, so as to be more user-friendly to right-hand dominant users. This arrangement also follows Professor Miller's suggestion that the "chunks" of information begin with a three-item chunk, and that the four-item chunk is last in the sequence (i.e., at the end of the rows R1, R2, R3, when reading left to right). When viewed as a whole, the alphabet keys in the FIG. 4 layout are arranged so that row R1 consists of a "chunk" of three consonant keys 20, followed by a "chunk" of two vowel keys 30, and ending with a "chunk" of four consonant keys 20. The same is true for row R2. Row R3 consists of a "chunk" of three consonant keys 20, followed by one vowel key 30, and ending with a "chunk" of four consonant keys 20. Another way of looking at the FIG. 4 layout is to view the rows R1, R2, R3, as having a "chunk" of three consonant keys 20, followed by a "chunk" of the vowel group 12, and ending with a "chunk" of four consonant keys 20.

An alternative embodiment that may be more user-friendly to left-hand dominant users provides four columns of the consonant keys 20 on the left side of the vowel group 12, and three columns of the consonant keys 20 on the right side of the vowel group 12. In this case, consonant keys "B", "C", "D", "F" are in row R1 on the left side of the vowel group 12, consonant keys "K", "L", "M", "N" are in row R2 on the left side of the vowel group 12, and consonant keys "S", "T", "V", "W" are in row R3 on the left side of the vowel group 12. The consonant keys 20 on the right side of the vowel group 12 are consonant keys "G", "H", "J" in row R1, consonant keys "P", "Q", "R" in row R2, and consonant keys "X", "Y", "Z" in row R3. The left-hand dominant configuration of consonant keys 20 is applicable to all of the alphabet key arrangement embodiments discussed herein.

To help highlight the vowel group 12 and bring its location in the alphabet key arraignment 10 to the attention of the user, the vowel group 12 may be outlined by a visible line or shape 60 that delineates the group of vowels 12 from the consonant keys 20. In the FIG. 4 embodiment, the visible line or shape 60 is substantially triangular shaped to match the substantially triangular shape of the vowel group 12. However, other shapes are possible, such as rectangular, oval, circular, heart-shape, and other design shapes having at least two sides. The shapes may completely or only partially surround the vowel group 12. In another embodiment, the vowel group 12 may be delineated by only a single line or shape on each side of the vowel group 12, wherein each line or shape is located between the vowel group 12 and the adjacent consonant keys 20. The visible line or shape 60 separates the vowel group 12 from the consonant keys and makes the vowels stand out from the consonant keys 20, thus aiding the user in locating the vowel keys 30. In an embodiment, the visible line or shape 60 may be physically raised or indented relative to the consonant keys 20 or the vowel keys 30, or a combination of both the consonant keys 20 and the vowel keys 30, so as to provide a physical contrast with the consonant keys 20 and/or vowel keys 30 that makes the group of vowels 12 stand out. In a virtual keyboard, this embodiment may include displaying the visible line or shape 60 in three dimensions (3D) while the consonant keys 20 or the vowel keys 30, or a combination of both the consonant keys 20 and the vowel keys 30 are displayed only in two dimensions, so as to provide a visual contrast with the consonant keys 20 and/or vowel keys 30 that makes the group of vowels 12 stand out. Alternatively, the consonant keys 20 and/or vowel keys 30 may also be displayed in 3D, but with dimensions that are less prominent than the dimensions of visible line or shape 60 so that the visible line or shape 60 stands out relative to the consonant keys 20 or the vowel keys 30, or a combination of both the consonant keys 20 and the vowel keys 30. For instance, the 3D visible line or shape 60 may appear raised more than the 3D consonant keys 20 and/or vowel keys 30. The 3D display may make the visible line or shape 60 either raised or indented, or a combination thereof.

Further, the vowel keys 30 in the vowel group 12 may have a particular color while the consonant keys 20 have no color or have a color that is different than the color of the vowel keys 30. Alternatively, the vowel keys 30 and the consonant keys 20 may have the same color. The color may including shading, highlighting or outlining of the vowel keys 30 and/or consonant keys 20. The color schemes may be customizable by a graphics designer and/or end user. Additionally, the actual print of the letters on the consonant keys 20 may have a color, and the print of the letters on the vowel keys 30 may have another color that is different than the color of the letters on the consonant keys 20. Alternatively, the print of the letters on the vowel keys 30 may be the same as the print of the letters on the consonant keys 20. Further, the letters on the consonant keys 20 may have a design pattern, and the letters on the vowel keys 30 may have another design pattern that is the same as or different than the design pattern on the consonant keys 20. The background of the keyboard 100 may also have a color that is the same as or different than the color of the consonant keys 20 and/or vowel keys 30. For virtual keyboards, the background color may be customizable by the graphics designer and/or end user.

FIG. 4 shows that the consonant keys 20 in each column are vertically unaligned with each other so that each of the consonant keys 20 in a column is offset in the horizontal direction "x" from other consonant keys 20 in that column. In this configuration, the consonant key "B" in the upper left corner of the alphabet key arrangement 10 is vertically unaligned with the consonant key "K" and the consonant key "S" in the lower left corner of the alphabet key arrangement 10 so that there is an offset in the horizontal direction "x" between the consonant key "B", the consonant key "K" and the consonant key "S". Similarly, the consonant key "J" in the upper right corner of the alphabet key arrangement 10 is vertically unaligned with the consonant key "R" and the consonant key "Z" in the lower right corner of the alphabet key arrangement 10 so that there is an offset in the horizontal direction "x" between the consonant key "J", the consonant key "R" and the consonant key "Z". This configuration may be desirable to better match the extension of a user's fingers over the alphabet key arrangement 10 when the user is typing on the keyboard 100. An outline 70 around a perimeter of the alphabet key arrangement 10 may still be a rectangle. In other embodiments, the outline 70 around a perimeter of the alphabet key arrangement 10 may have polygonal or other shapes, or be one or more lines extending only partially around the perimeter of the alphabet key arrangement 10.

Figure 7A:
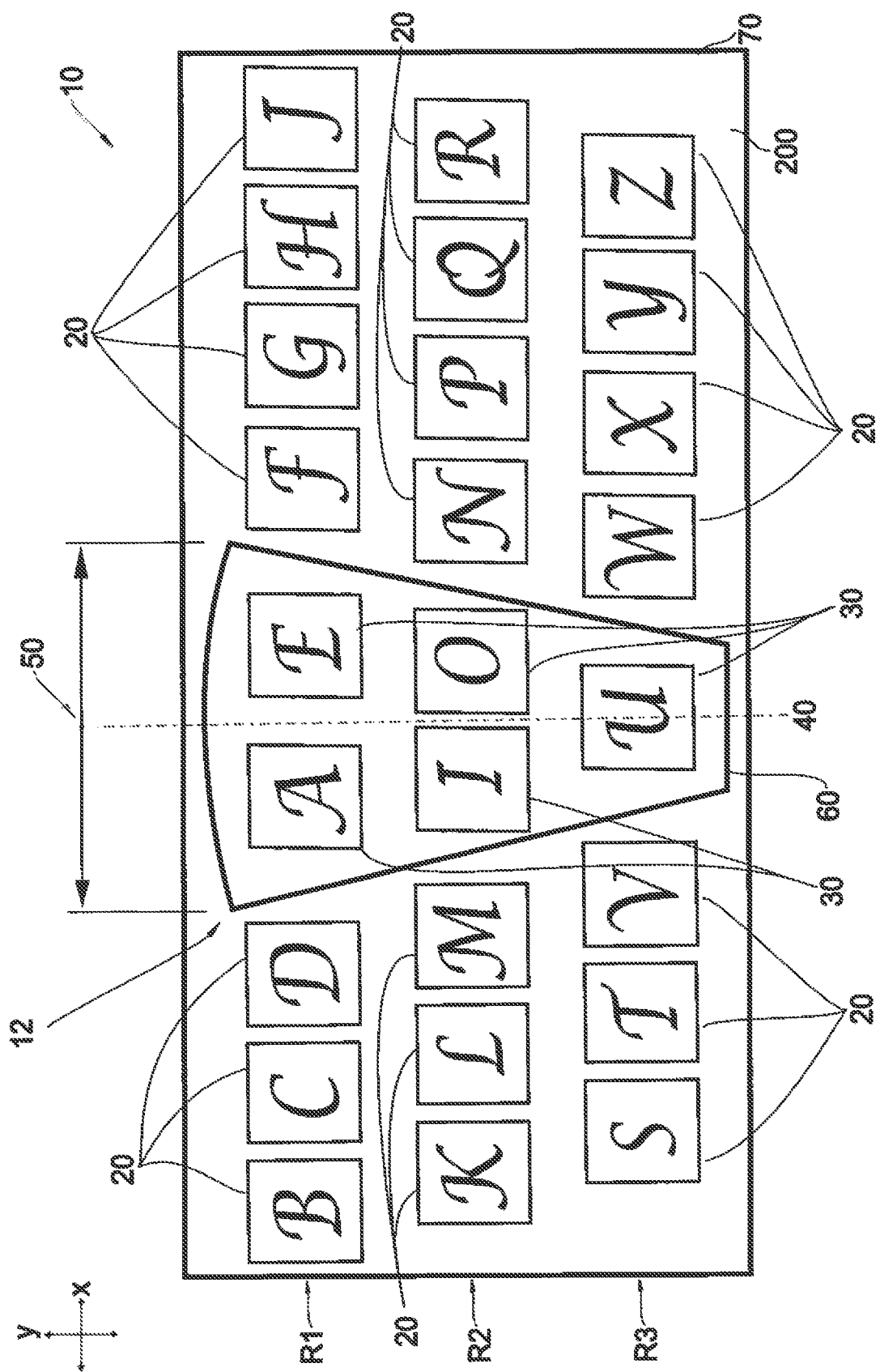
FIGS. 7a and 7b shows further embodiments of an alphabet key arrangement for a keyboard.
Figure 7B:
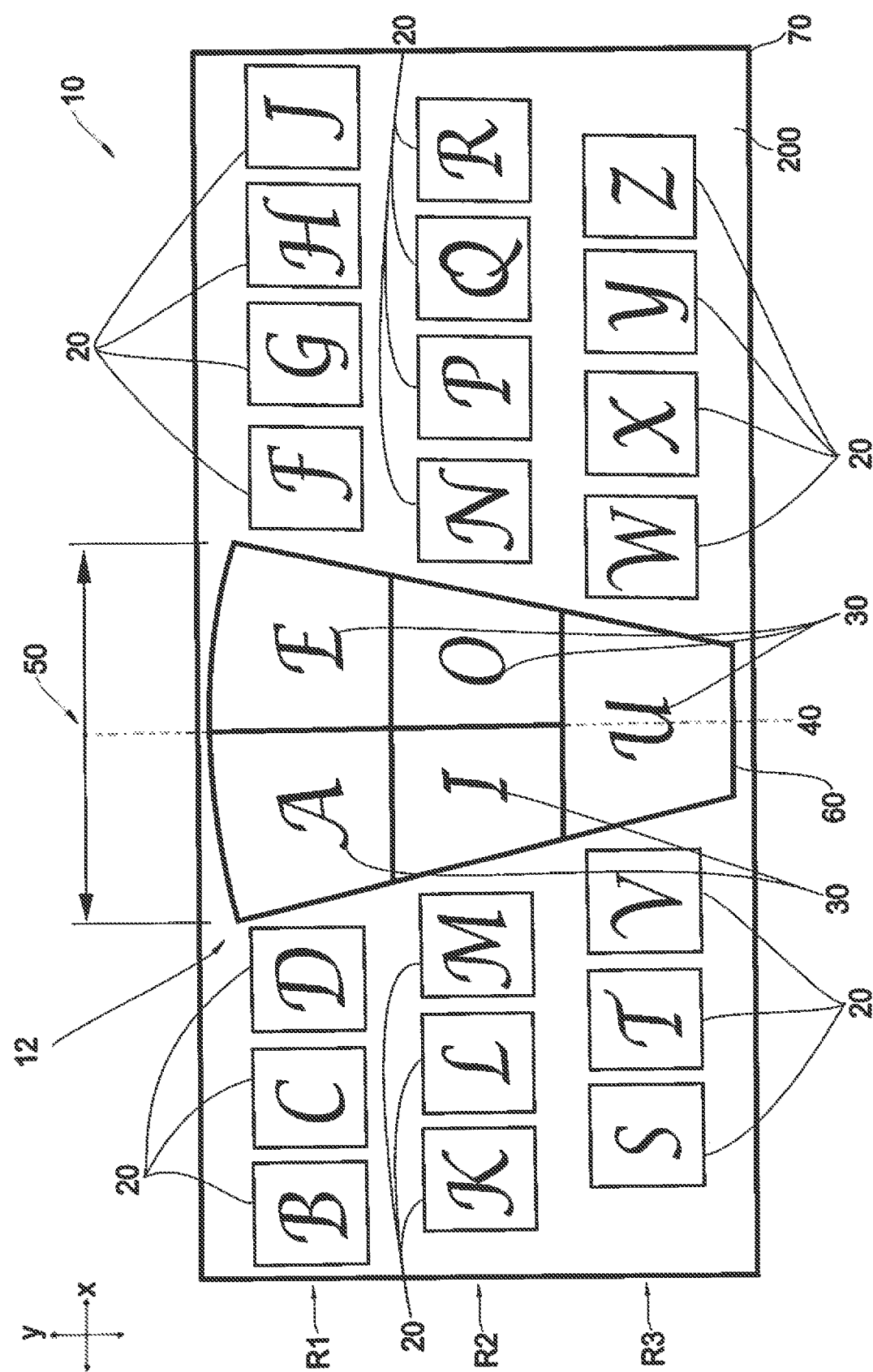

In an alternative embodiment, the consonant keys 20 in each column are vertically aligned with each other so that there is no offset in the horizontal direction "x" among the consonant keys 20 in a column, as shown in FIGS. 7a and 7b. This configuration may provide for an aesthetically pleasing uniform arrangement of the consonant keys 20 and vowel group 12 that substantially fills the area of the alphabet section 200 on the keyboard 100.

FIG. 5 shows another preferred embodiment of the alphabet key arrangement 10. This embodiment is similar to the embodiments discussed above with respect to FIG. 4, and includes the aspects and alternatives discussed above except that the alphabet key arrangement 10 in FIG. 5 is curved. In this embodiment, each of the three columns of the consonant keys 20 and each of the four columns of the consonant keys 20 are angled from the vowel group 12 relative to the horizontal direction "x", so that the alphabet key arrangement 10 has a curved shape. The columns of the consonant keys 20 in this embodiment are angled with respect to the vertical direction "y" so that the three rows R1, R2, R3 slant from the vowel group 12. The consonant keys 20 in each column may be offset from an adjacent consonant key 20 in the column. Alternatively, the consonant keys 20 in each column may be aligned with each other so that there is no offset between adjacent consonant keys 20 in a column. This curved alphabet key arrangement 10 may be used with a curved keyboard 100, or in another application according to ergonomic considerations, or the end-user's choice. FIG. 5 shows that the vowel key "A" is vertically aligned with the vowel key "I" so that there is no offset in the horizontal direction "x" between vowel key "A" and the vowel key "I", and the vowel key "E" is vertically aligned with the vowel key "O" so that there is no offset in the horizontal direction "x" between the vowel key "E" and the vowel key "O". However, the vowel keys may be unaligned as discussed with respect to the embodiment shown in FIG. 4.

FIG. 6 shows an embodiment of the alphabet key arrangement 10 that is similar to the ones discussed with respect to FIG. 4 above, but does not include the visible line or shape 60. In this case, the vowel group 12 may be distinguished from the consonant keys 20 via the coloring or shading of the vowel keys, and optionally along with a different color for the letters of the vowel keys 30 than for the letters of the consonant keys 20. The FIG. 6 embodiment of the alphabet key arrangement 10 may be rectangular, as shown, or may be curved, or have any other shape.

FIG. 7a shows an embodiment of the alphabet key arrangement 10 that is similar to the ones discussed with respect to FIG. 4, but includes no coloring or shading of the alphabet keys or letters. In this embodiment, the vowel group 12 is distinguished from the consonant keys 20 via the visible line or shape 60. FIG. 7b shows an embodiment of the alphabet key arrangement 10 that is similar to the ones discussed with respect to FIG. 4, but includes the vowel group 12 as a grid pattern 13. In the grid pattern 13, the vowel keys 30 abut each other and are delineated by lines 15. The grid pattern 13 may be used with any of the embodiments discussed herein.

Figure 8:
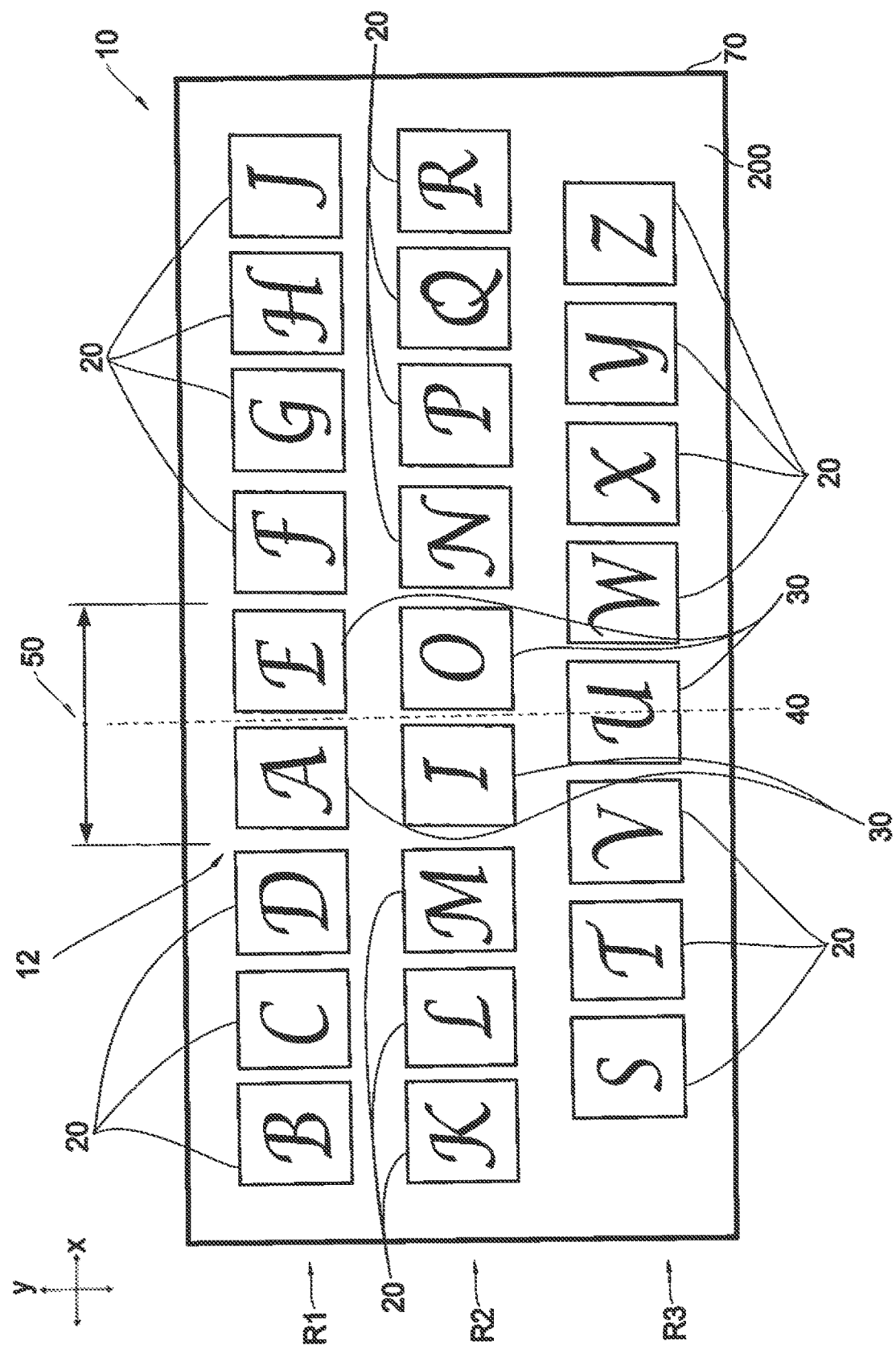
FIG. 8 shows an additional embodiment of an alphabet key arrangement for a keyboard.

FIG. 8 shows an embodiment of the alphabet key arrangement 10 that is similar to the ones discussed with respect to FIG. 4, above, but does not include the visible line or shape 60 nor coloring or shading of the alphabet keys 30 or letters thereon. The vowel group 12 is distinguished from the consonant keys 20 simply by being grouped near the center of the alphabet key arrangement 10.

FIGS. 9a-9e show different layouts of the vowel keys 30 within the vowel group 12. Each of the layouts may or may not include the visible line or shape 60 discussed above, and may or may not include the coloring and/or shading discussed above. FIG. 9a shows the layout discussed above in which the vowel key "A" and the vowel key "E" are in row R1, the vowel key "I" and the vowel key "O" are in row R2, and the vowel key "U" is in row R3 and is centered with respect to the vowel key "I" and the vowel key "O" in the horizontal direction "x". That is, the vowel key "U" is centered along the imaginary line 40 to be at a midpoint 50 of the vowel group 12 in the horizontal direction "x". FIG. 9b shows a layout in which the vowel key "A" is in row R1, the vowel key "E" and the vowel key "I" are in row R2, and the vowel key "O" and the vowel key "U" are in row R3. The vowel key "A" is centered with respect to the vowel key "E" and the vowel key "I" in the horizontal direction "x", and is centered along the imaginary line 40 to be at a midpoint 50 of the vowel group 12 in the horizontal direction "x".

FIG. 9c shows a layout in which the symmetric shape of the vowel group 12 is an hourglass, though other shapes with this vowel group 12 arrangement are possible. In this layout, the vowel key "A" and the vowel key "E" are in row R1, the vowel key "I" is in row R2, and the vowel key "O" and the vowel key "U" are in row R3. The vowel key "I" is centered with respect to the vowel key "A" and the vowel key "E" in the horizontal direction "x" so that the vowel key "I" is centered along the imaginary line 40 to be at a midpoint 50 of the vowel group 12 in the horizontal direction "x". FIG. 9d shows a layout having a substantially triangular shape as discussed above, but with the vowel keys in ascending order. Specifically, the vowel key "A" and the vowel key "E" are in row R3, the vowel key "I" and the vowel key "O" are in row R2, and the vowel key "U" is in row R1 and is centered with respect to the vowel key "I" and the vowel key "O" in the horizontal direction "x". The vowel key "U" is thus centered along the imaginary line 40 to be at a midpoint 50 of the vowel group 12 in the horizontal direction "x". FIG. 9e shows an hourglass layout similar to FIG. 9c, but with the vowel keys in ascending order. In this embodiment, the vowel key "A" and the vowel key "E" are in row R3, the vowel key "I" is in row R2, and the vowel key "O" and the vowel key "U" are in row R1. The vowel key "I" is centered with respect to the vowel key "A" and the vowel key "E" in the horizontal direction "x" so that the vowel key "I" is centered along the imaginary line 40 to be at a midpoint 50 of the vowel group 12 in the horizontal direction "x".

In each of the embodiments of FIGS. 9a-9e, the consonant keys 20 are arranged in a three-by-three pattern and a three-by-four pattern on left and right sides of the vowel group 12, as discussed above. The three-by-three pattern may be on the left side of the vowel group 12 and the three-by-four pattern may be on the right sides of the vowel group 12, and vice-versa.

Figure 10A:
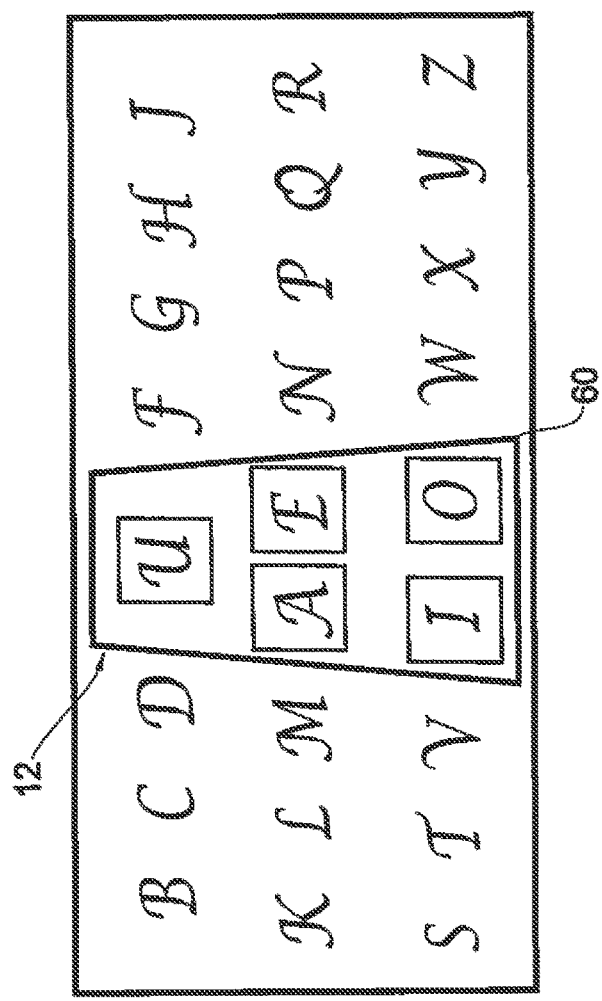
FIGS. 10a and 10b show further embodiments of vowel keys arranged in a vowel group.
Figure 10B:
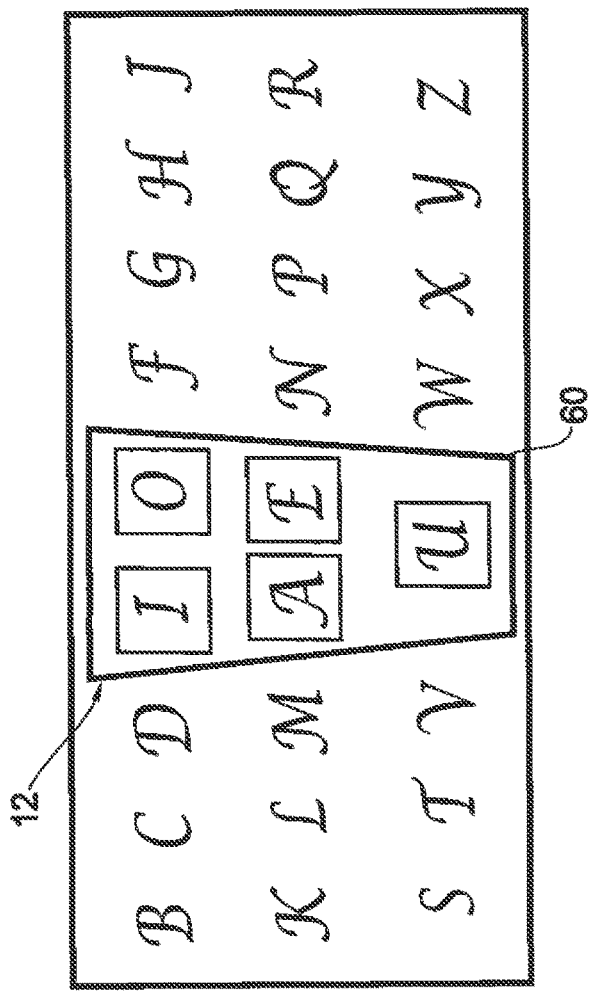
Figure 11A:
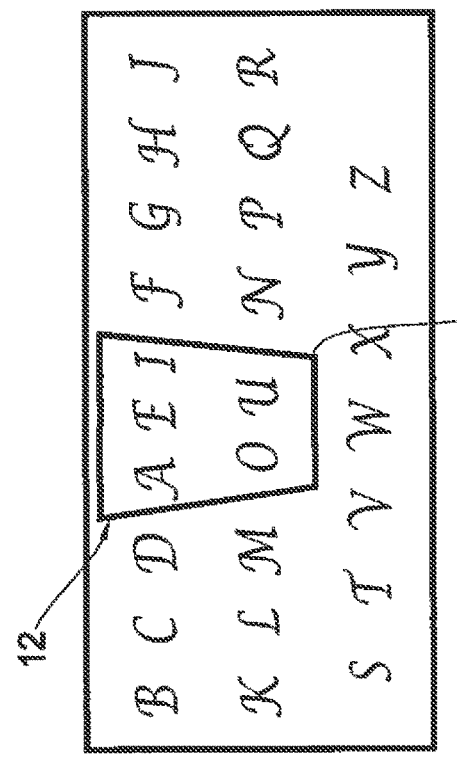
FIGS. 11a-11d show other embodiments of vowel keys arranged in a vowel group.
Figure 11B:
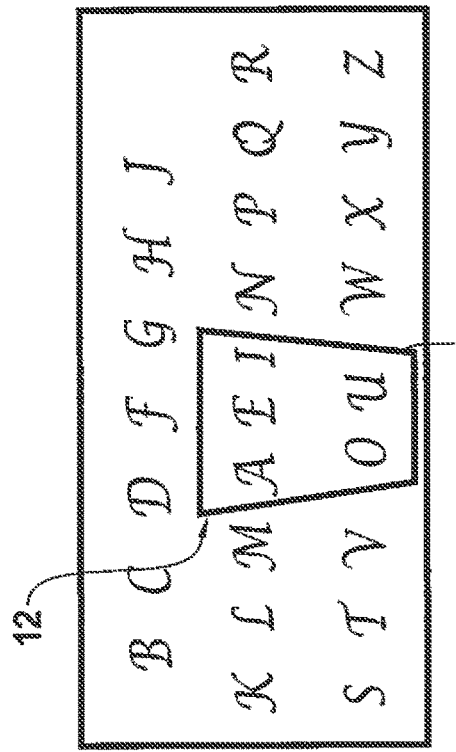
Figure 11C:
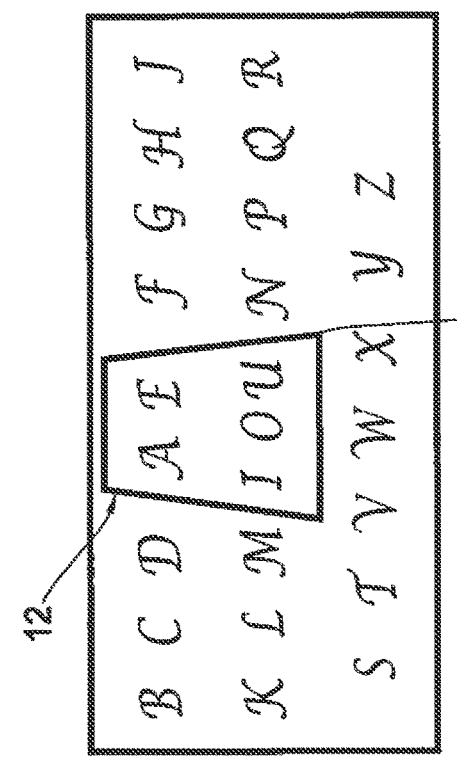
Figure 11D:
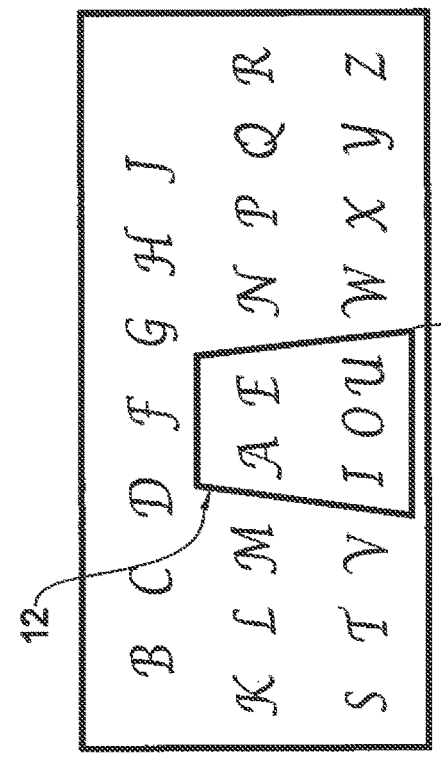

FIGS. 10a and 10b show further layouts of the vowel keys 30 within the vowel group 12. In these embodiments, the vowel keys 30 may not be necessarily in alphabetical order. FIG. 10a shows that the vowel key "U" is in row R1, the vowel key "A" and the vowel key "E" are in row R2, and the vowel key "I" and the vowel key "O" are in row R3. The vowel key "U" is centered with respect to the vowel key "A" and the vowel key "E" in the horizontal direction "x" so that the vowel key "U" is centered along the imaginary line 40 to be at a midpoint 50 of the vowel group 12 in the horizontal direction "x". FIG. 10b shows that the vowel key "I" and the vowel key "O" are in row R1, the vowel key "A" and the vowel key "E" are in row R2, and the vowel key "U" is in row R3. The vowel key "U" is centered with respect to the vowel key "A" and the vowel key "E" in the horizontal direction "x" so that the vowel key "U" is centered along the imaginary line 40 to be at a midpoint 50 of the vowel group 12 in the horizontal direction "x". Each of the layouts may or may not include the visible line or shape 60 discussed above, and may or may not include the coloring and/or shading discussed above.

FIGS. 11a-11d show other layouts of the vowel keys 30 within the vowel group 12. In these embodiments, the vowel group 12 traverses only two of the three rows, R1, R2, R3, of the alphabet key arrangement 10. Each of these layouts may or may not include the visible line or shape 60 discussed above, and may or may not include the coloring and/or shading discussed above.

Figure 12:
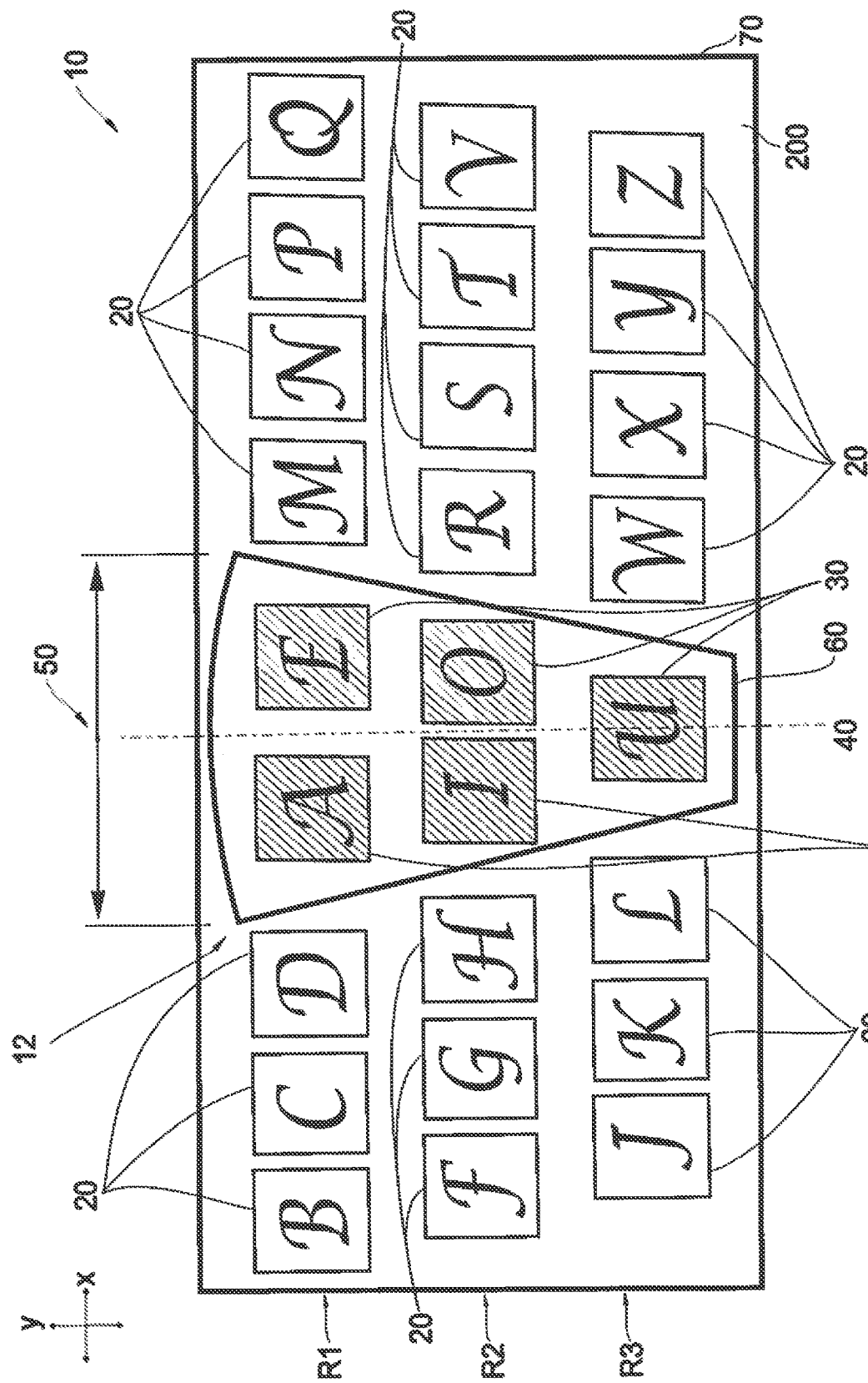
FIG. 12 shows an alternative embodiment of an alphabet key arrangement for a keyboard.

FIG. 12 shows an alternative embodiment of an alphabet key arrangement 10 for a keyboard. The alphabet key arrangement 10 is similar to the preferred embodiment discussed with respect to FIG. 4, and may include all of the features, options and alternatives of the preferred embodiment discussed above. The difference between the alternative embodiment of FIG. 12 and the preferred embodiment of FIG. 4 relates to the arrangement of the consonant keys 20. In the alternative embodiment of FIG. 12, the three-by-three pattern of consonant keys 20 on the left side of the vowel group 12 are arranged with consonant keys "B", "C", "D" in row R1, as in the preferred embodiment of FIG. 4. However, consonant keys "F", "G", "H" are in row R2, and consonant keys "J", "K", "L" are in row R3. Thus, the first nine consonant keys 20 are arranged in alphabetical order in rows R1, R2, R3 on the left side of the vowel group 12. The three-by-four pattern of consonant keys 20 on the right side of the vowel group 12 have consonant keys "M", "N", "P", "Q" in row R1, consonant keys "R", "S", "T", "V" in row R2. Consonant keys "W", "X", "Y", "Z" are in row R3, as in the preferred embodiment. The last twelve consonant keys 20 are thus arranged in alphabetical order in rows R1, R2, R3 on the right side of the vowel group 12. In this regard, having the consonant keys 20 arranged in alphabetical order from left to right on opposite sides of vowel group 12 means that: (i) the consonant keys 20 are in alphabetical order from left to right extending from one side of the vowel group 12 to the opposite side of the vowel group 12 as shown in FIG. 4; and (ii) the consonant keys 20 are in alphabetical order from left to right in the rows R1, R2, R3, on either side of the vowel group 12 as shown in FIG. 12.

Figure 13A:
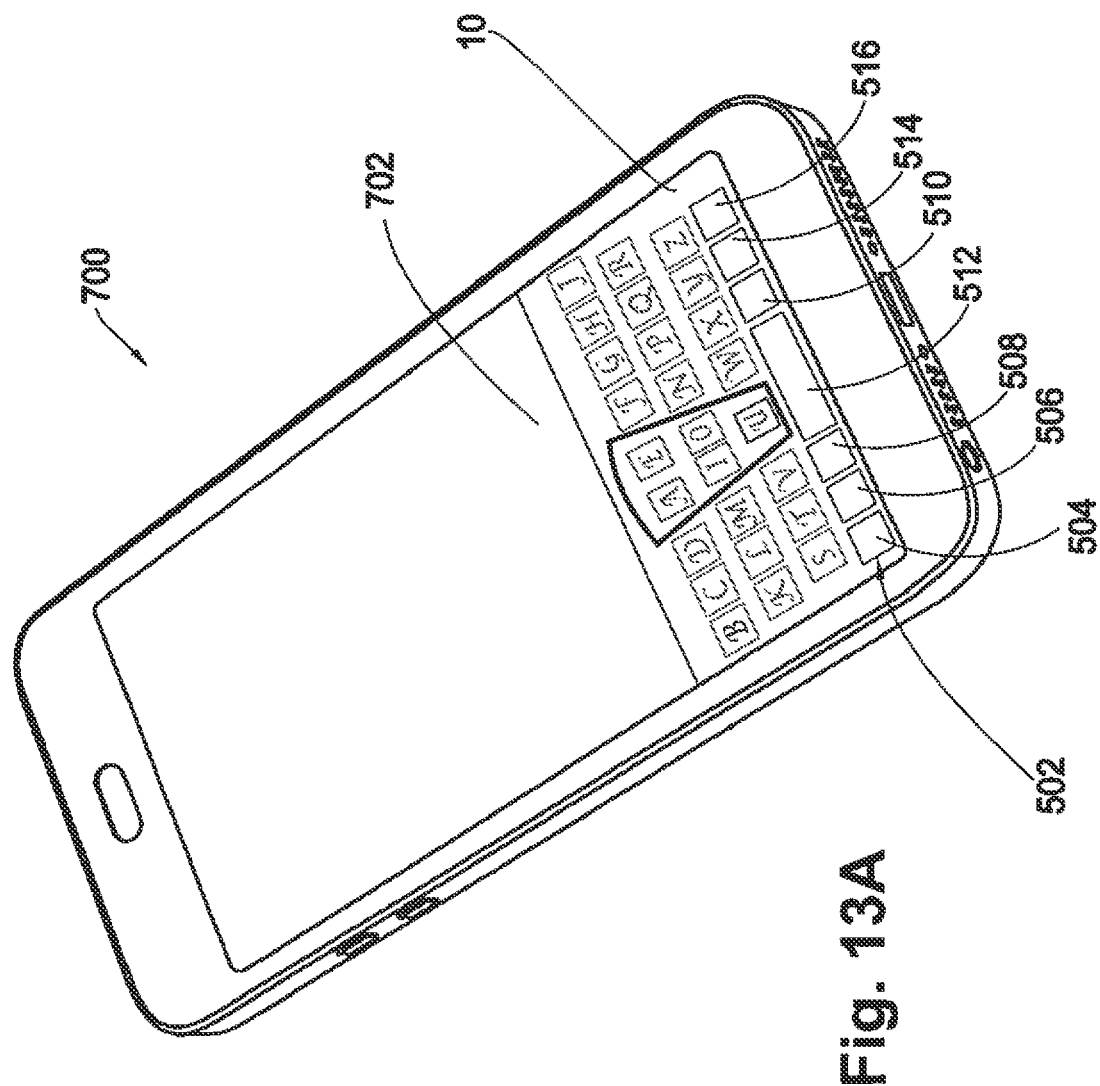
FIGS. 13a-13c show embodiments of mobile devices having some of the alphabet key arrangements of the present disclosure.
Figure 13B:
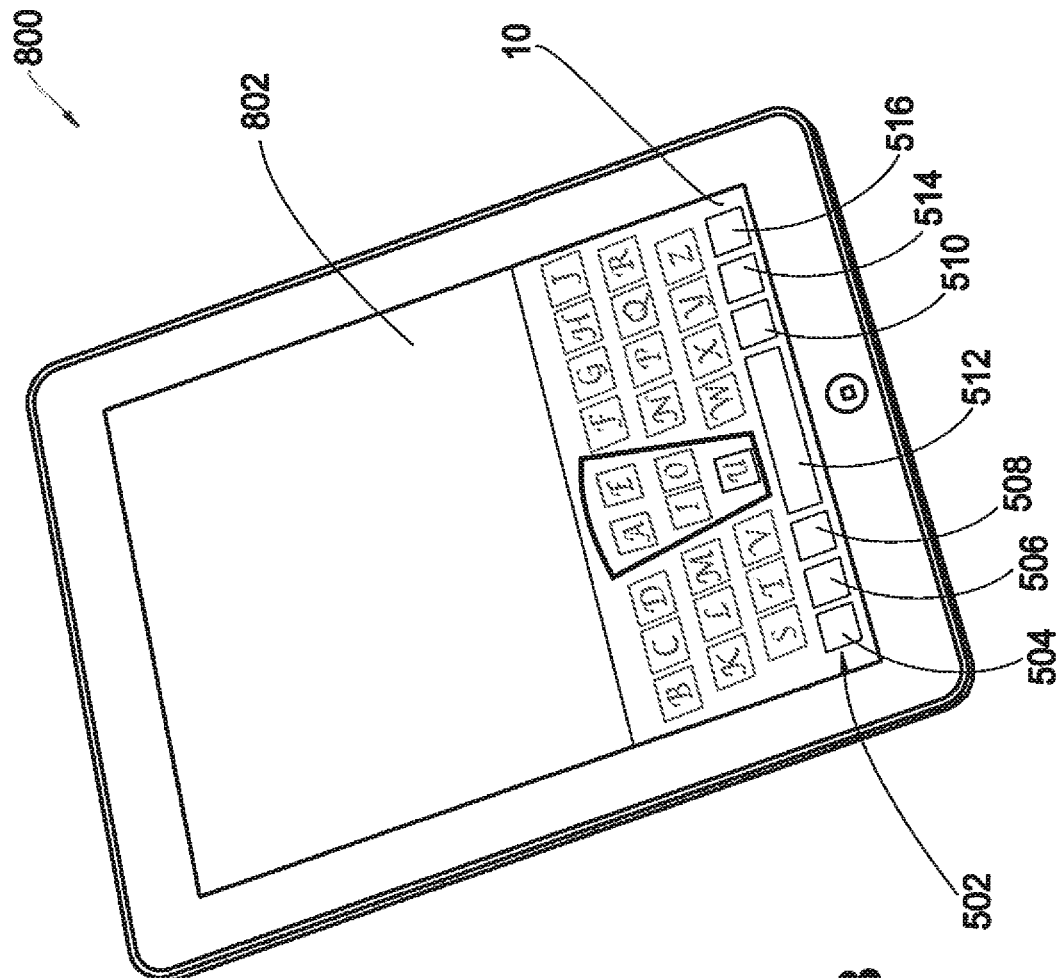
Figure 13C:
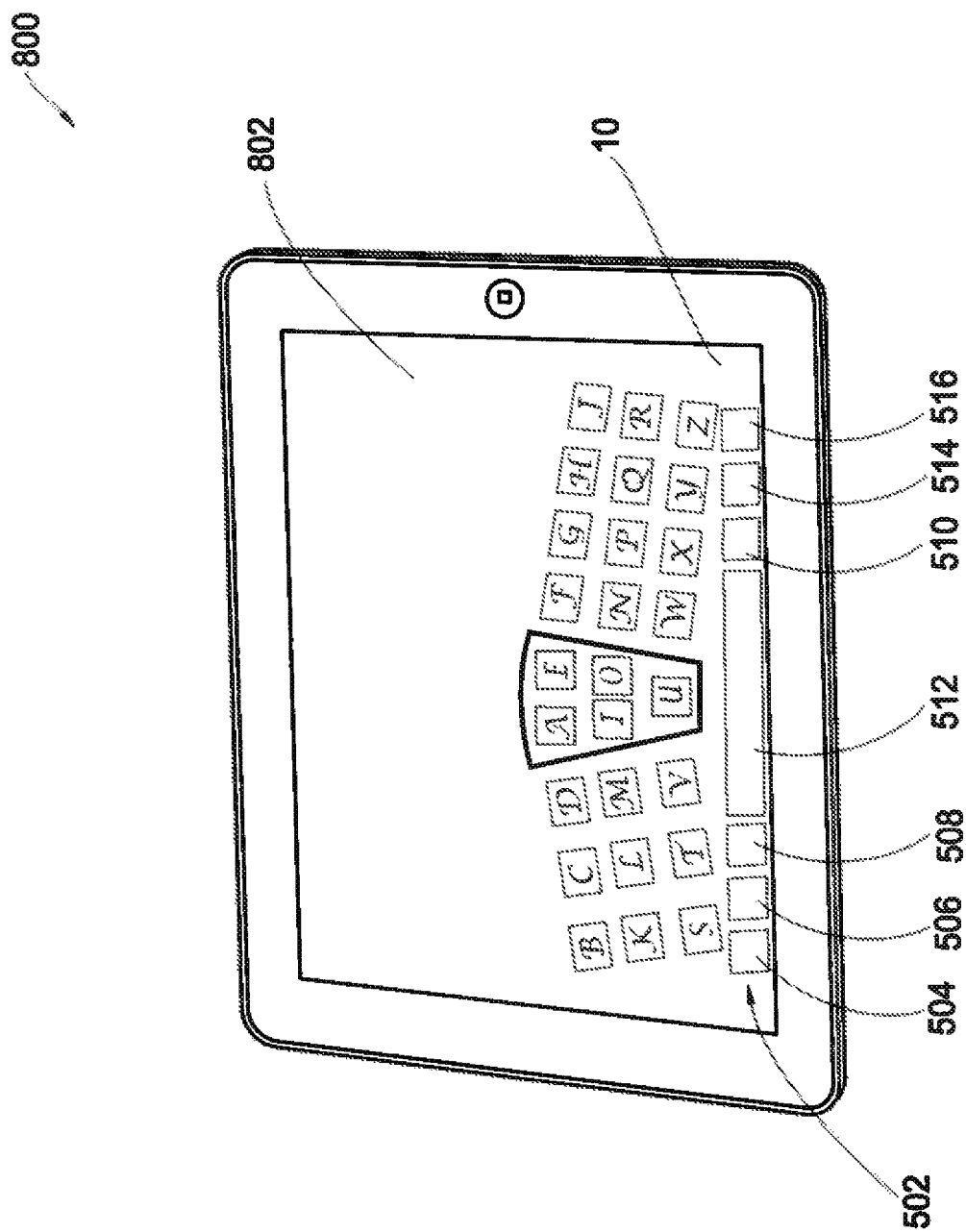

FIG. 13a shows an embodiment of a mobile device 700 having a digital screen 702. The mobile device 700 in the illustrated embodiment is a mobile phone. The digital screen 702 is a touchscreen that displays a virtual keyboard having the alphabet key arrangement 10 discussed herein. FIG. 13a shows that the alphabet key arrangement 10 on the digital screen 702 is the arrangement shown in FIG. 4. However, any of the alphabet key arrangements 10 discussed herein, along with their alternatives and differing embodiments, may be used on the digital screen 702. FIG. 13a shows that an additional key section 502 may be provided below virtual keyboard. The additional key section 502 may include miscellaneous keys, including a "shift" key 504, a number key 506, an emoji key 508, a microphone key 510, a space bar 512, a "return" or "enter" key 514 and a "backspace" or "delete" key 516, among others. In alternative embodiments, the additional key section 502 may be provided above virtual keyboard, or some or all of the keys 504-516 of the additional key section 502 may be provided on one or both sides of the additional key section 502. FIG. 13b shows an embodiment of a tablet 800 as the mobile device. The tablet 800 includes a digital screen 802 as a touchscreen that displays a virtual keyboard having the alphabet key arrangement 10 of FIG. 4. However, any of the alphabet key arrangements 10 discussed herein, along with their alternatives and differing embodiments, may be used on the digital screen 802. For instance, FIG. 13c shows that the digital screen 802 of the tablet 800 displays the alphabet key arrangement 10 of FIG. 5. The additional key section 502 may be provided below virtual keyboard as shown in FIGS. 13b and 13c. In alternative embodiments, the additional key section 502 may be provided above virtual keyboard in FIGS. 13b and 13c, or some or all of the keys 504-516 of the additional key section 502 may be provided on one or both sides of the additional key section 502 in FIGS. 13b and 13c.

The virtual keyboard may be customizable by a graphics designer and/or end user. For example, the graphics designer and/or end user may select various combinations of colors, designs, shapes, letter fonts, vowel key arrangements, consonant key arrangements, background colors, and visible lines or shapes around the vowel group 12, in order to personalize the alphabet key arrangement 10. Such customization may be provided via a program or application downloaded onto the mobile device 700, 800 from a website 712 or an external server 714 via an internet connection as shown in FIG. 14. In another embodiment, the customization may be provided via a stand-alone application downloaded from an external site, such as a virtual application store 710, onto the mobile device 700, 800. In these embodiments, the mobile device 700, 800 includes a central processing unit (CPU) 716 for controlling aspects of the downloads, as well as for controlling the functioning of the downloaded program and/or application. The control and processes of the CPU 716 may be according to known methods used to download, install, and execute such programs and applications.

In some embodiments, lights may be provided around the perimeter of the alphabet section 200 of the keyboard 100, around the vowel group 12, and/or around or on the visible line or shape 60. Lights may also be provided around each of the consonant keys 20, or around groups of consonant keys 20, such as around the group of consonant keys 20 on the left of the vowel group 12 and around the group of consonant keys 20 on the right of the vowel group 12. For the hard keyboard, the lights may be LED lights or other suitable bulb or lighting mechanism. Further, any part of the keyboard may be backlit. For the virtual keyboard, the above-described lighting may be part of the display.

In further embodiments of the virtual keyboard, any part of the alphabet section 200 of the keyboard 100 may be interactive. For instance, selecting one of the keys, such as a vowel key 30, may result in an audible sound, a change in the digital display of the alphabet section 200, or movement of an icon in the digital display of the alphabet section 200. Further, the virtual keyboard may include artificial intelligence (AI) that improves the accuracy of selecting the keys of the alphabet section 200. As an example, the AI may predict the next letter key the user may select, i.e., "H" after the user selects in order to spell the word "THE". In this process, the sensitivity of the touch screen around the "H" key may be increased to assist the user in selecting the next probably letter. In addition, or alternatively, the display of the key having the letter "H" may change to make the key more prominent. This may include changing color or changing from a two dimensional appearance to a 3D appearance.

Embodiments of the alphabet key arrangement 10 discussed herein provide an intuitive layout in which the consonant keys 20 are arranged in alphabetical order, and the frequently-used vowel keys 30 are grouped together over a center of the arrangement for easy access and to make them conspicuously stand out from the consonant keys 20. The layout is thus logical and easy to learn. This may be especially true for younger users, and for children learning to recite the alphabet beginning with "A" and ending at "Z". The balance and symmetry of the design makes the alphabet key arrangement 10 more user-friendly, and can be adapted to both right-hand dominant and left-hand dominant users. Confining the alphabet key arrangement 10 to three rows allows the user to utilize the second row R2 as the "home" row and then easily reach the first row R1 and the third row R3 with their fingers. The alphabet key arrangement 10 discussed herein can be used in any keyboard application involving hard keyboards and virtual keyboards, and can replace the awkward QWERTY and Dvorak layouts.

While the present disclosure has been described with emphasis on certain embodiments, it should be understood that within the scope of the appended claims, the present disclosure can be practiced other than as specifically described herein.

While various embodiments usable within the scope of the present disclosure have been described with emphasis, it should be understood that within the scope of the appended claims, the present invention can be practiced other than as specifically described herein.

What is claimed is:

1. A keyboard arranged on a tangible medium, the keyboard comprising:
   an arrangement of alphabet keys, wherein the alphabet keys are provided in a total of three rows extending in a horizontal direction, each alphabet key in the three rows representing one letter of the English-language alphabet so that the three rows of alphabet keys include all consonants and all vowels of the English-language alphabet, wherein
   two of the three rows of alphabet keys have a total of nine keys each, and one of the three rows of alphabet keys has a total of eight keys,
      the consonants are represented with consonant keys and vowels are represented by vowel keys,
   the vowel keys are grouped together in a vowel group having a symmetric shape in which the vowel group is vertically divided into a left half and right half that is a mirror image of the left half, the vowel group traversing the three rows and at least two columns, and at least a portion of the vowel group is located at a center of the arrangement,
      the consonant keys are arranged in alphabetical order from left to right on opposite sides of vowel group, such that three columns of the consonant keys are on one of a left side of the vowel group and a right side of the vowel group and four columns of the consonant keys are on the other of the left side and the right side of the vowel group, and
   at least one vowel key in the vowel group is centered to be at a midpoint of the vowel group in the horizontal direction.

2. The keyboard of claim 1, wherein the vowel group is outlined by a visible line or shape delineating the group of vowels from the consonant keys.

3. The keyboard of claim 2, wherein the visible line or shape is substantially triangular shaped.

4. The keyboard of claim 2, wherein the visible line or shape is raised or indented relative to the consonant keys or the vowel keys.

5. The keyboard of claim 1, wherein the vowel keys have a color, and the consonant keys have no color or have a color that is different than or the same as the color of the vowel keys.

6. The keyboard of claim 1, wherein letters on the consonant keys have a color, and letters on the vowel keys have a color that is different than or the same as the color of the letters on the consonant keys.

7. The keyboard of claim 1, wherein three columns of the consonant keys are on the left side of the vowel group, and four columns of the consonant keys are on the right side of the vowel group.

8. The keyboard of claim 1, wherein four columns of the consonant keys are on the left side of the vowel group, and three columns of the consonant keys are on the right side of the vowel group.

9. The keyboard of claim 1, wherein the consonant keys in each column are vertically aligned with each other so that none of the consonant keys in a column is offset in the horizontal direction from other consonant keys in that column.

10. The keyboard of claim 1, wherein the consonant keys in each column are vertically unaligned with each other so that each consonant key in a column is offset in the horizontal direction from an adjacent consonant key in that column.

11. The keyboard of claim 1, wherein the symmetric shape of the vowel group is substantially triangular, such that vowel key "a" and vowel key "e" are in a first row of the three rows of alphabet keys, vowel key "i" and vowel key "o" are in a second row of the three rows of alphabet keys, and vowel key "u" is in a third row of the three rows of alphabet keys and is centered in the horizontal direction with respect to the vowel key "i" and the vowel key "o".

12. The keyboard of claim 1, wherein the symmetric shape of the vowel group is substantially triangular, such that vowel key "a" is in a first row of the three rows of alphabet keys, vowel key "e" and vowel key "i" are in a second row of the three rows of alphabet keys, and vowel key "o" and vowel key "u" are in a third row of the three rows of alphabet keys, and vowel key "a" is centered in the horizontal direction with respect to the vowel key "e" and the vowel key "i".

13. The keyboard of claim 1, wherein the symmetric shape of the vowel group is substantially triangular, such that vowel key "u" is in a first row of the three rows of alphabet keys, vowel key "i" and vowel key "o" are in a second row of the three rows of alphabet keys, and vowel key "a" and vowel key "e" are in a third row of the three rows of alphabet keys, and vowel key "u" is centered in the horizontal direction with respect to the vowel key "i" and the vowel key "o".

14. The keyboard of claim 1, wherein the symmetric shape of the vowel group is substantially triangular, such that vowel key "i" and vowel key "o" are in a first row of the three rows of alphabet keys: vowel key "a" and vowel key "e" are in a second row of the three rows of alphabet keys, and vowel key "u" is in a third row of the three rows of alphabet keys and is centered in the horizontal direction with respect to the vowel key "a" and the vowel key "e".

15. The keyboard of claim 1, wherein the symmetric shape of the vowel group is substantially triangular, such that vowel key "u" is in a first row of the three rows of alphabet keys, vowel key "a" and vowel key "e" are in a second row of the three rows of alphabet keys, and vowel key "i" and vowel key "o" are in a third row of the three rows of alphabet keys, and vowel key "u" is centered in the horizontal direction with respect to the vowel key "a" and the vowel key "e".

16. The keyboard of claim 1, wherein the symmetric shape of the vowel group is an hourglass, such that vowel key "a" and vowel key "e" are in a first row of the three rows of alphabet keys, vowel key "i" is in a second row of the three rows of alphabet keys and is centered in the horizontal direction with respect to the vowel key "a" and the vowel key "e", and vowel key "o" and vowel key "u" are in a third row of the three rows of alphabet keys.

17. The keyboard of claim 1, wherein the symmetric shape of the vowel group is an hourglass, such that vowel key "o" and vowel key "u" are in a first row of the three rows of alphabet keys, vowel key "i" is in a second row of the three rows of alphabet keys and is centered in the horizontal direction with respect to the vowel key "o" and the vowel key "u", and vowel key "a" and vowel key "e" are in a third row of the three rows of alphabet keys.

18. The keyboard of claim 1, wherein a consonant key in the upper left corner of the arrangement is vertically unaligned with a consonant key in the lower left corner of the arrangement so that there is an offset in the horizontal direction between the consonant key in the upper left corner of the arrangement and the consonant key in the lower left corner of the arrangement, and
  a consonant key in the upper right corner of the arrangement is vertically unaligned with a consonant key in the lower right corner of the arrangement so that there is an offset in the horizontal direction between the consonant key in the upper right corner of the arrangement and the consonant key in the lower right corner of the arrangement.

19. The keyboard of claim 1, wherein an outline around a perimeter of the alphabet keys is a rectangle shape.

20. The keyboard of claim 1, wherein each of the three columns of the consonant keys and each of the four columns of the consonant keys are angled from the vowel group relative to the horizontal direction, so that the arrangement has a curved shape.

21. The keyboard of claim 1, wherein the keyboard is a virtual keyboard on a digital screen.

22. The keyboard of claim 21, wherein
  the vowel group is outlined by a visible line or shape delineating the group of vowels from the consonant keys,
  the vowel keys have a color, and the consonant keys have no color or have a color that is different than or the same as the color of the vowel keys,
  letters on the consonant keys have a color, and letters on the vowel keys have a color that is different than or the same as the color of the letters on the consonant keys, and
  at least one of an arrangement of the consonant keys, an arrangement of the vowel keys, the symmetric shape of the vowel group, the visible line or shape, a color of the vowel keys, the letters on the consonant keys, and the letters on the vowel keys, is changeable by a user via a computer program.

23. A mobile device having the keyboard of claim 1.

24. The keyboard of claim 1, wherein the vowel keys are raised or indented relative to the consonant keys.

* * * * *